US007856426B2

(12) United States Patent
Mintchev

(10) Patent No.: US 7,856,426 B2
(45) Date of Patent: Dec. 21, 2010

(54) UDDI REGISTRY EXTENSION FOR RATING UDDI ARTIFACTS

(75) Inventor: Alexander D. Mintchev, Sofia (BG)

(73) Assignee: SAP AG, Walldorf (DE)

( * ) Notice: Subject to any disclaimer, the term of this patent is extended or adjusted under 35 U.S.C. 154(b) by 843 days.

(21) Appl. No.: 11/704,452

(22) Filed: Feb. 8, 2007

(65) Prior Publication Data

US 2008/0195598 A1 Aug. 14, 2008

(51) Int. Cl.
G06F 17/30 (2006.01)
(52) U.S. Cl. ...................... 707/694; 707/688
(58) Field of Classification Search ........... None
See application file for complete search history.

(56) References Cited

U.S. PATENT DOCUMENTS

2006/0212473 A1* 9/2006 Carusi et al. ............ 707/103 R

* cited by examiner

Primary Examiner—Baoquoc N To
(74) Attorney, Agent, or Firm—Schwegman, Lundberg & Woessner, P.A.

(57) ABSTRACT

A method and system to provide subjective evaluations for artifacts in a Universal Description Discovery and Integration (UDDI) registry (version 3 or later). An extension to a UDDI registry receives a request from a client to add a subjective evaluation to an artifact in the UDDI registry, the request including a key identifying the artifact and an evaluation value to be associated with the artifact. The extension stores an evaluation, including the artifact identifying key and the associated evaluation value. The extension receives a request from a client to find a specific type of artifact in the UDDI registry, the request including an evaluation qualifier. The extension receives from the registry a list of keys identifying artifacts responsive to the request. The extension then provides the client with a list of stored evaluation values associated with the artifact keys in the artifact list.

31 Claims, 20 Drawing Sheets

```xml
<?xml version="1.0" encoding="UTF-8" ?>
- <uddi_eval:add_evaluation xmlns:uddi_eval="urn:uddi-sap-com:eval_api"
    xmlns:dsig="http:// www.w3.org/2000/09/xmldsig#" xmlns:uddi="urn:uddi-org:api_v3"
    xmlns:scc14n="urn:uddi-org:schemaCentricC14N:2002-07-10"
    xmlns:xsi="http://www.w3.org/2001/XMLSchema-instance" xsi:schemaLocation="urn:uddi-
    sap-com:eval_api add_eval.xsd">
    <uddi:authInfo>awrt784qss</uddi:authInfo>
  - <uddi_eval:entity_evaluations>
    - <uddi_eval:business_service key="uddi:uddi-sap.com:web-service-example">
      - <uddi_eval:evaluations>
          <uddi_eval:evaluation tModelKey="uddi:evaluation:quality" name="Excelllent"
            value="6" />
          <uddi_eval:evaluation tModelKey="uddi:evaluation:speed" name="Very Good"
            value="5" />
        </uddi_eval:evaluations>
      </uddi_eval:business_service>
    - <uddi_eval:business_entity key="uddi:uddi-sap.com:be-service-example">
      - <uddi_eval:evaluations>
          <uddi_eval:evaluation tModelKey="uddi:evaluation:quality" name="Excelllent"
            value="6" />
          <uddi_eval:evaluation tModelKey="uddi:evaluation:speed" name="Very Good"
            value="5" />
        </uddi_eval:evaluations>
      </uddi_eval:business_entity>
    </uddi_eval:entity_evaluations>
  </uddi_eval:add_evaluation>
```

FIG. 6B

```
                                                              — 190
<find_service xmlns="urn:uddi-org:api_v3">
    <findQualifiers>                                      — 192
        <findQualifier> uddi:evaluation:quality</findQualifier>
    </findQualifiers>                                     — 194
    <categoryBag>
        <keyedReference tModelKey="uddi:uddi.org:wsdl:types" keyName="WSDL
            type" keyValue="service" />
    </categoryBag>
</find_service>
```

```
                                                              — 196
<find_service xmlns="urn:uddi-org:api_v3">
    <categoryBag>
        <keyedReference tModelKey="uddi:uddi.org:wsdl:types" keyName="WSDL
            type" keyValue="service" />
    </categoryBag>
</find_service>
```

FIG. 10

UDDI REGISTRY EXTENSION FOR RATING UDDI ARTIFACTS

FIELD OF THE INVENTION

An embodiment relates generally to the field of web services. More particularly, an embodiment relates to a method and a system for providing subjective ratings for artifacts found in UDDI v3 Registries.

BACKGROUND OF THE INVENTION

The Universal Description Discovery and Integration (UDDI) standards project aims at speeding up interoperability and adoption of Web services by enabling enterprises to quickly and dynamically publish, discover and invoke such services. UDDI advances this goal through the creation of standards-based specifications for service description and discovery. The UDDI standard provides for registries to be set up on the internet that allow providers of web services to publish information about these services on a certain registry and allow users of web services to search that registry for web services they want to use. The current version of UDDI is UDDI v3.

UDDI v3 registries store several persistent data structures called entities or artifacts. Artifacts are stored in eXtensible Markup Language (XML) format. UDDI v3 artifacts include the following types: Business Entity, Business Service, Binding Template, tModel, Publisher assertion, and Subscription. A Business Entity describes a business or other organization that provides web services. A Business Service artifact is linked subordinately to a Business Entity and describes a collection of related web services offered by the business described in the Business Entity. A Binding Template is linked subordinately to a Business Service and describes the technical information necessary to use a particular web service. A tModel is a reusable model of a concept that may be referenced by other artifacts, usually Binding Templates. Concepts that a tModel can model include a type of web service or a taxonomy system or a protocol used by web services. A Publisher Assertion is linked subordinately to a Business Entity and describes the relationship that Business Entity has with another Business Entity. A Subscription describes a standing request to keep track of changes to the artifacts described by the Subscription.

There are several types of entities that interact with a UDDI v3 registry. An Operator is a person or organization that maintains an instance of UDDI v3 registry software and typically hosts the server that the UDDI v3 registry software instance runs on. A software instance that interacts with a UDDI v3 registry and is a Client. A person or organization that the client acts on behalf of is a User. A Publisher is a user that establishes or changes artifacts on a UDDI v3 registry. Other users may access the registry to find a web service to use.

The UDDI v3 standard provides a variety of mechanisms to classify a web-service artifact in terms of standard and custom classification criteria that are objective. These classifications can only be established or altered by the owning publisher of the UDDI v3 artifact. However, the UDDI v3 standard does not provide a means for the users of a UDDI v3 registry to publish their own, subjective evaluations about the perceived "quality" of a web-service or other artifact found in the UDDI v3 registry, and to search for a web-service based on such subjective criteria. Nor do the currently known providers of UDDI v3 registers (e.g. registries from Systinet, Microsoft, SAP, Apache, Oracle) provide a means for a user of the UDDI v3 registry to publish a subjective evaluation of an artifact from this registry and later to search for artifacts on the basis of such subjective evaluations.

BRIEF DESCRIPTION OF THE DRAWINGS

An embodiment of the present invention is illustrated by way of example and not limitation in the figures of the accompanying drawings, in which like references indicate similar elements and in which:

FIG. 6B shows an example of an Evaluation Addition Request.

FIG. 10 shows an example of a Request to find artifacts with evaluations.

DETAILED DESCRIPTION

A method and system for rating UDDI v3 Registry artifacts is described. In the following description, for purposes of explanation, numerous specific details are set forth in order to provide a thorough understanding of an embodiment of the present invention. It will be evident, however, to one skilled in the art that the present invention may be practiced without these specific details. In other instances, structures and devices are shown in block diagram form in order to avoid obscuring the invention. The embodiments described are compatible with UDDI version 3, but may be compatible with other versions as well.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In some embodiments, hard-wired circuitry may be used in place of or in combination with one or more processors executing machine-accessible instructions to implement the present invention. Thus, the present invention is not limited to any specific combination of hardware circuitry and processors executing machine-accessible instructions.

Some embodiments of the invention are described by referring to flowcharts. Describing methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 1:
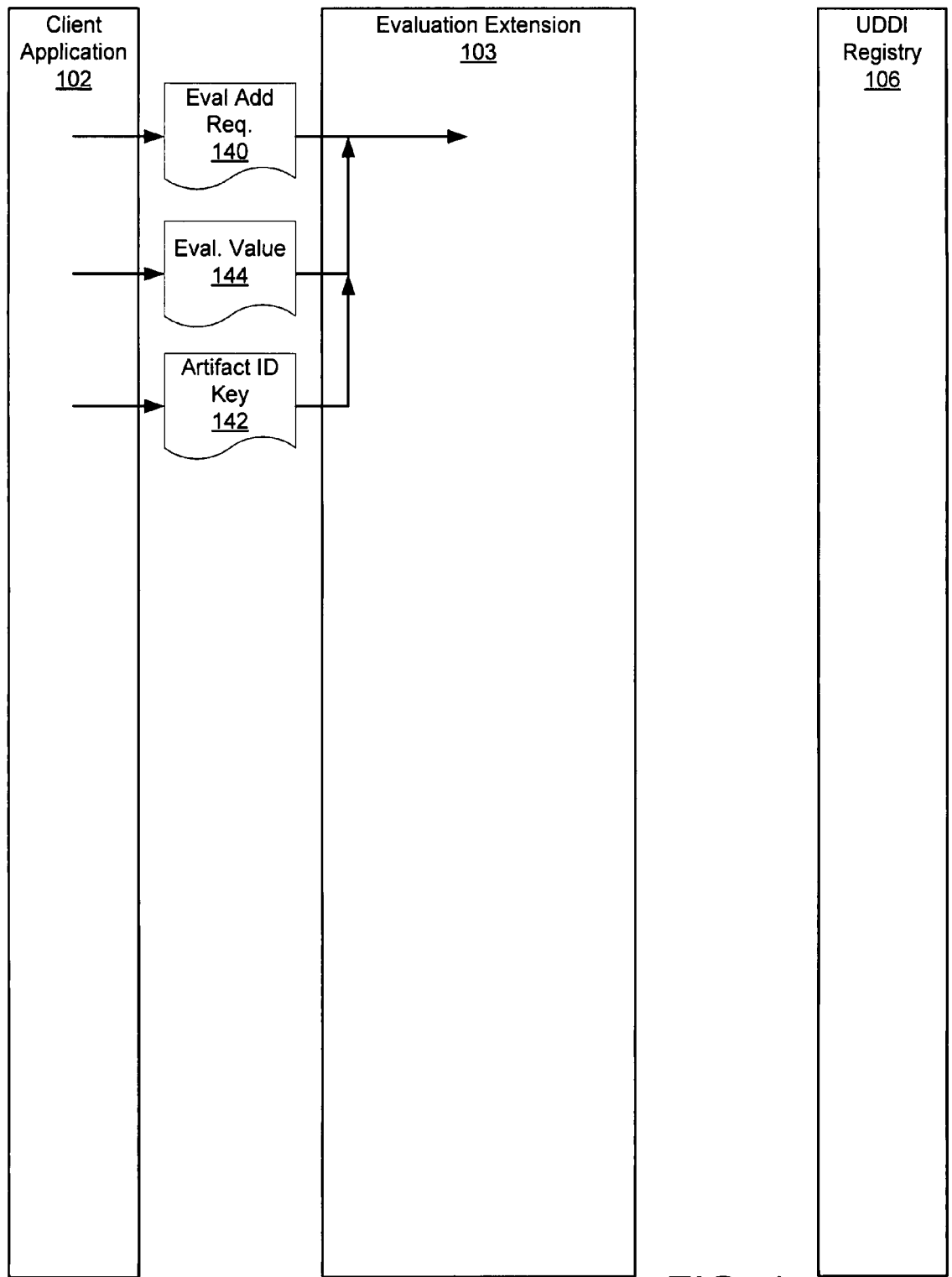
FIG. 1 shows an Evaluation Extension apparatus and its Evaluation Addition function.

FIG. 1 shows an Evaluation Extension apparatus and its Evaluation Addition function. One embodiment of the invention is an Evaluation Extension 103. The Evaluation Extension 103 extends the functionality of a UDDI v3 Registry 106 in response to requests from a Client Application 102 regarding the evaluation of artifacts in the UDDI v3 Registry 106. In one embodiment, the Evaluation Extension 103 is operated on the same server as the UDDI v3 registry 106. In another embodiment, the Evaluation Extension 103 is on a separate server. A Client Application 102 sends a Request 140 to add an evaluation to an artifact in the UDDI v3 Registry 106. The Client 102 sends with the Request 140 an Evaluation Value 144 to be associated with the artifact and a Key 142 that uniquely identifies the artifact. If the Evaluation Extension 103 determines the Evaluation Addition Request 140 is authorized and valid, the Evaluation Extension 103 stores the Artifact Identifying Key 142 and the associated Evaluation Value 144.

Figure 2:
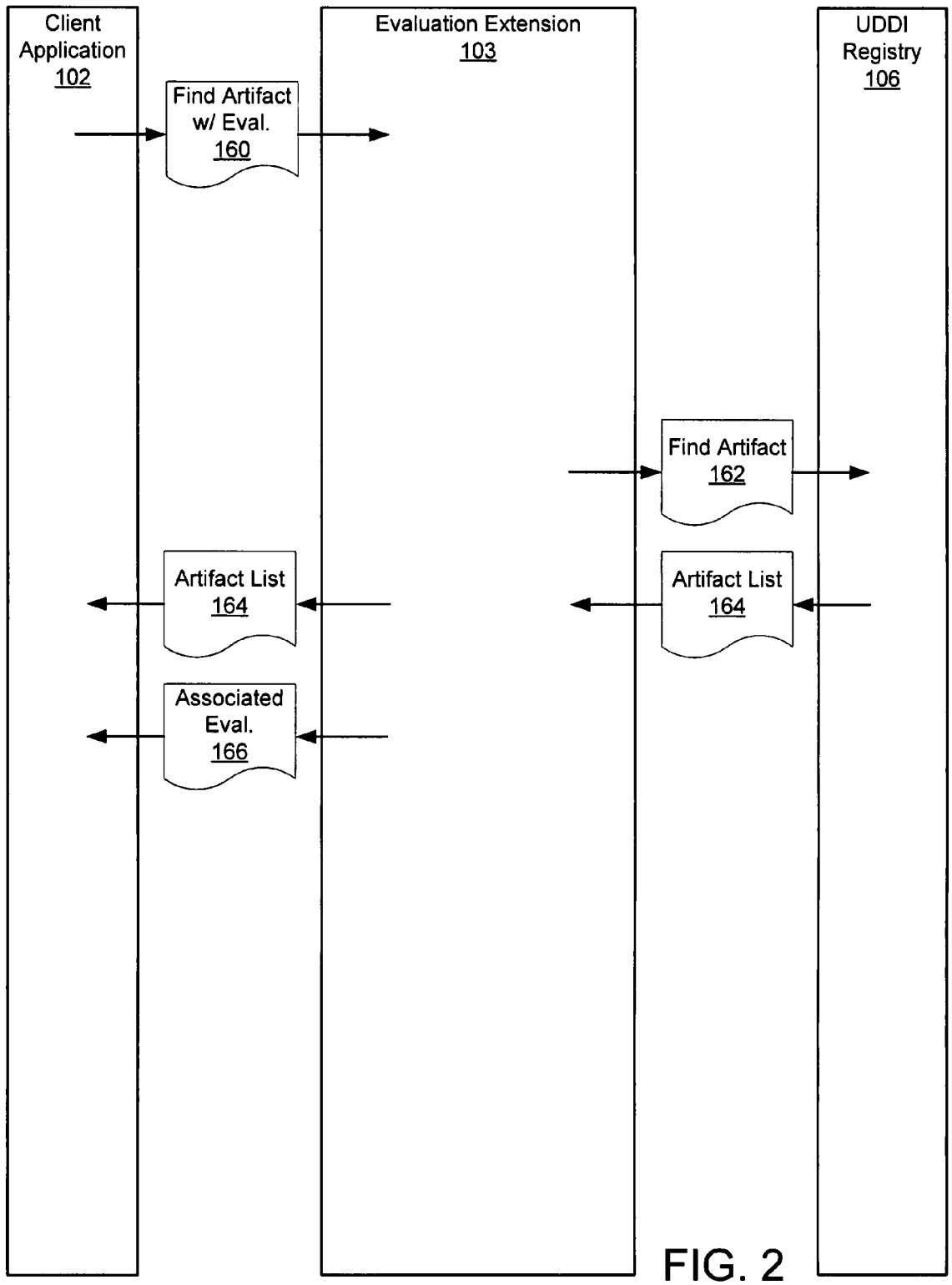
FIG. 2 shows the Evaluation Extension apparatus and its Evaluation Providing function.

FIG. 2 shows the Evaluation Extension apparatus and its Evaluation Providing function. The Client Application 102 sends a Request 160 to find a specific type of artifact in the UDDI v3 Registry 106, the Request including an Evaluation Qualifier. The Client 102 includes the Qualifier to limit the finding of artifacts to only those artifacts that have a certain evaluation associated with them. The Evaluation Extension 103 receives the Find Artifact with Evaluation Qualifier Request 160 and creates a Redacted Find Artifact Request 162 by removing the Evaluation Qualifier. The Evaluation Extension 103 sends the Redacted Find Artifact Request 162 to the UDDI v3 Registry 106. the UDDI v3 Registry returns a List 164 of identification keys of artifacts that match the remaining criteria and qualifiers of the Redacted Find Artifact Request 162. The Evaluation Extension 103 compiles a List 166 of stored evaluations associated with the artifact identification keys in the Artifact List 164. The Evaluation Extension 103 sends the Artifact List and the Associated Evaluations 166 to the Client 102.

Figure 3:
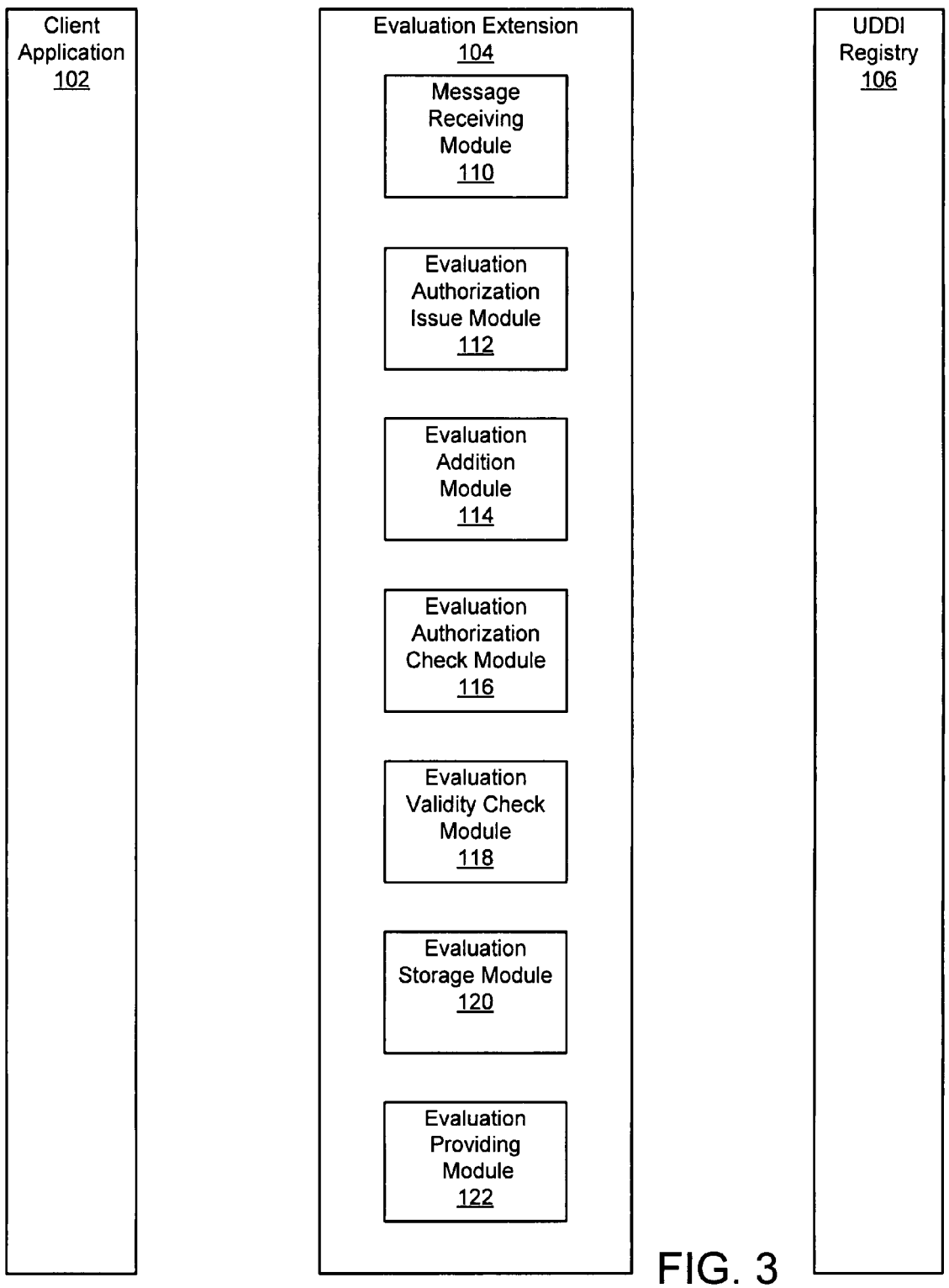
FIG. 3 shows an Evaluation Extension apparatus with components.

FIG. 3 shows an Evaluation Extension apparatus with components. In one embodiment, an Evaluation Extension 104 is comprised of several components, including a Message Receiving Module 110, an Evaluation Authorization Issue Module 112, an Evaluation Addition Module 114, an Evaluation Authorization Check Module 116, an Evaluation Validity Check Module 118, and an Evaluation Storage Module 120. The function of each component is described in the following figures and discussions.

Figure 4:
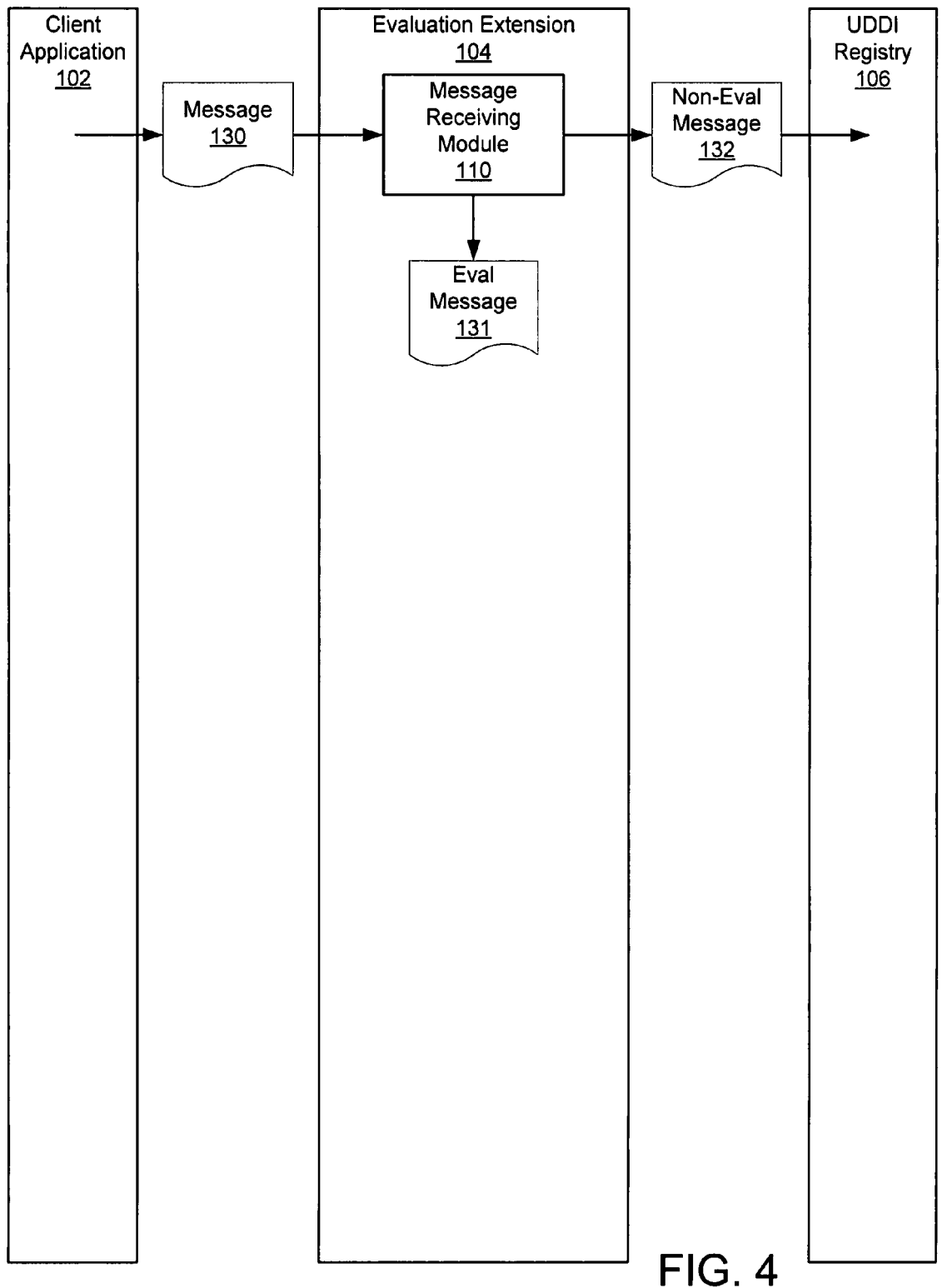
FIG. 4 shows a Message Receiving Module, a component of the Evaluation Extension.

FIG. 4 shows a Message Receiving Module, a component of the Evaluation Extension. The Message Receiving Module 110 is a component of the Evaluation Extension 104 that monitors messages passed between the client application 102 and the UDDI v3 Registry 106. The evaluation extension 104 receives a message 130 from the client 102 to the UDDI v3 Registry 106. If the evaluation extension 104 determines that the message is regarding an evaluation of an artifact in the registry 106, then the message 130 is classified as an evaluation message 131 and retained in the extension 104 for further processing. Evaluation messages 131 are not passed on the registry 106 unless the extension 104 later decides to do so. A Message 130 that the extension 104 determines is not regarding artifact evaluation is classified as a non-evaluation message 132 and passed on the registry 106 without further processing by the extension 104.

Figure 5:
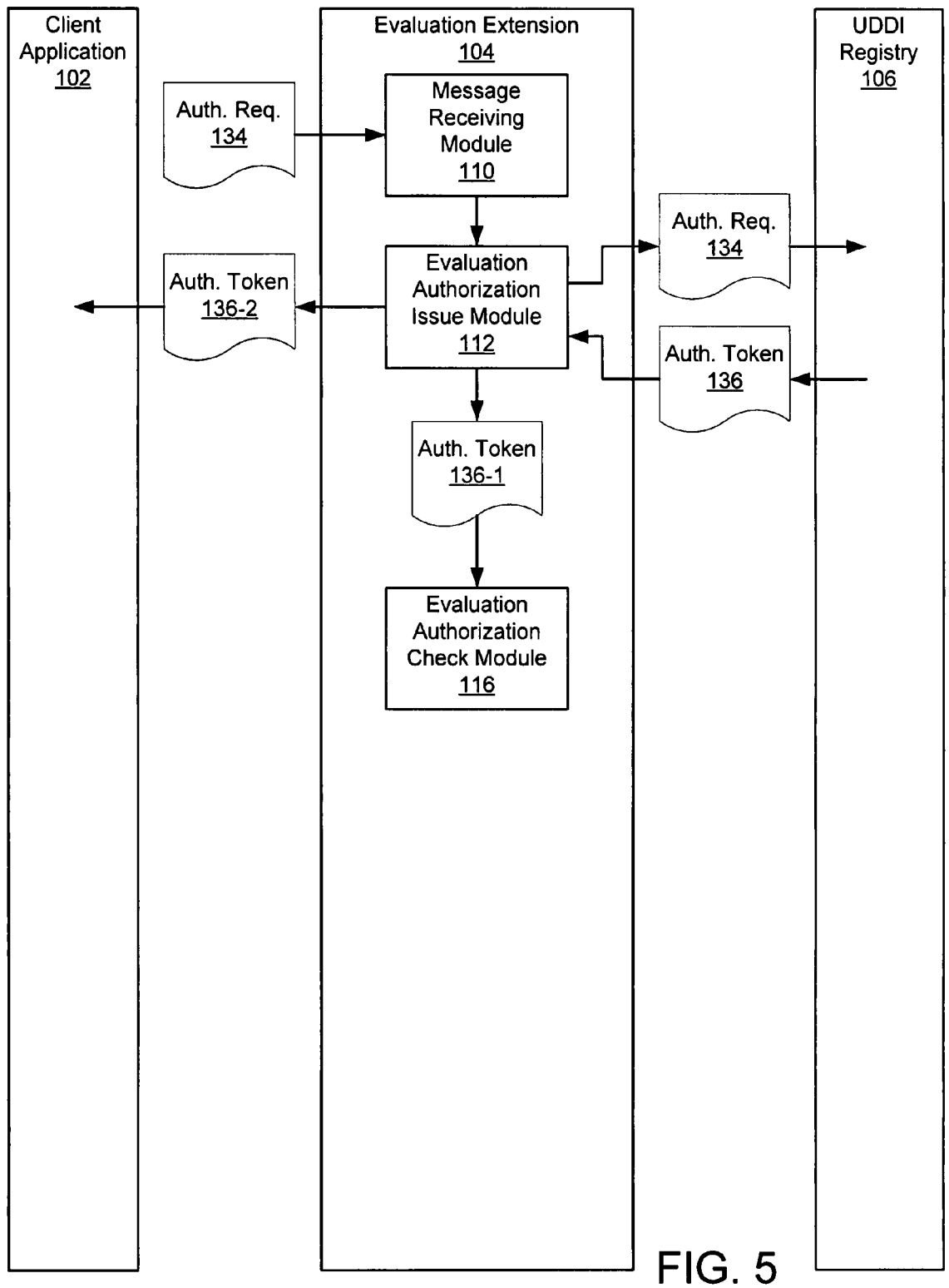
FIG. 5 shows the function of an Evaluation Authorization Issue Module, a component of the Evaluation Extension.

FIG. 5 shows the function of an Evaluation Authorization Issue Module, a component of the Evaluation Extension. In one embodiment, the evaluation extension 104 has an Evaluation Authorization Issue Module 112. The evaluation authorization issue modules 112 facilitates limiting the addition of evaluations to clients with authorization to do so from the registry 106. A client may send a message with a request for authorization 134. In some embodiments, the request 134 includes a user identification key and a user credential, both associated with a user of the client 102. In some embodiments, the authorization request is specifically for authorization to add an evaluation. In those embodiments, the message receiving module 110 intercepts the request 134 and sends it to the Evaluation Authorization Issue Module 112, which redacts details relating to evaluations and sends a general request for authorization 134 to the registry. In other embodiments, the authorization request 134 is not specifically to add an evaluation. In those embodiments, the Message Receiving Module 110 passes the authorization request 134 directly to the Registry 106. If the Registry 106 approves, it sends an Authorization Token 136 back to the Client 102. The Evaluation Authorization Issue Module 112 intercepts the Authorization Token 136, stores one copy 136-1 in an Evaluation Authorization Check Module 116 and forwards another copy 136-2 to the Client 102.

Figure 6A:
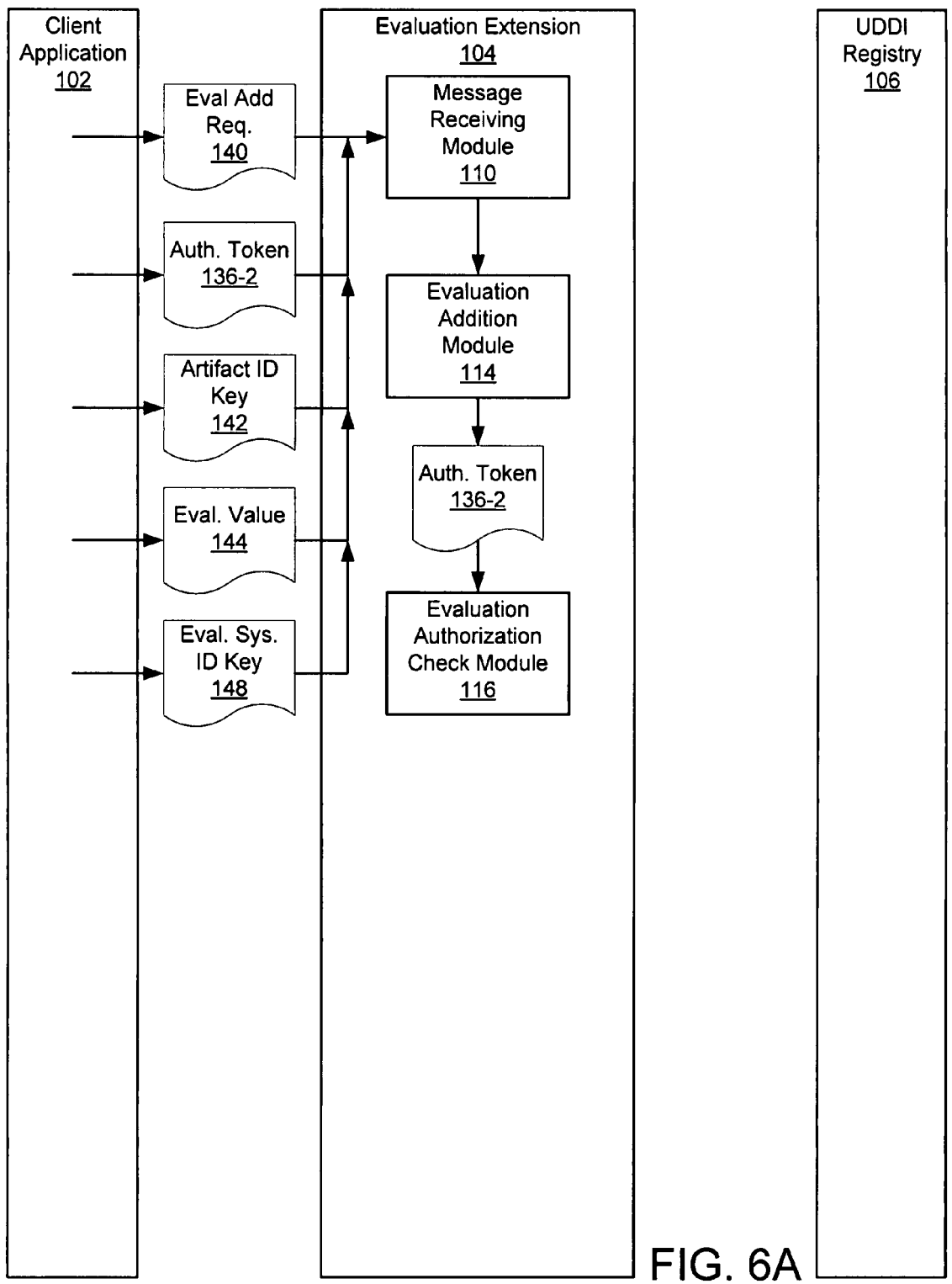
FIG. 6A shows the function of an Evaluation Addition Module and an Evaluation Authorization Check Module, components of the Evaluation Extension.

FIG. 6A shows the function of an Evaluation Addition Module and an Evaluation Authorization Check Module, components of the Evaluation Extension. In one embodiment, the Evaluation Extension 104 has an Evaluation Addition Module 114. A Client 102 may send a Request 140 to add an evaluation to an artifact in the Registry 106. In some embodiments, this Evaluation Addition Request 140 includes additional information items, including an Authorization Token 136-2, a Key 142 identifying the artifact, an Evaluation Value 144 to be assigned to the artifact and a Key 148 identifying an Evaluation System stored in the Registry 106. In other embodiments, the additional information items may be sent in separate messages. The Message Receiving Module 110 intercepts the Evaluation Addition Request 140 and sends it to the Evaluation Addition Module 114. The Evaluation Addition Module 114 sends the Authorization Token 136-2 received from the Client 102 to the Evaluation Authorization Check Module 116. If the Authorization Token 136-2 from the Client 102 matches a stored copy of the Token 136-1, then the Evaluation Authorization Check Module 116 determines the Evaluation Addition Request 140 is authorized.

FIG. 6B shows an example of an Evaluation Addition Request. A sample of Evaluation Addition Request 600 is shown in XML format. In this sample, there are two artifacts to be evaluated: a business service and a business entity. A business service element 602 gives as an attribute the artifact identifying key for the business service. A first evaluation element 604 gives as attributes the identifying key for the evaluation system, the evaluation value to be assigned and a string corresponding to the evaluation value. A second evaluation element 606 is included for a second evaluation of the same business service. Similarly, a group of business entity evaluation elements 608 identify a business entity and specify evaluation systems and evaluation values to be assigned to the business entity. An XML schema for Evaluation Addition Requests is shown in the appendix.

Figure 7:
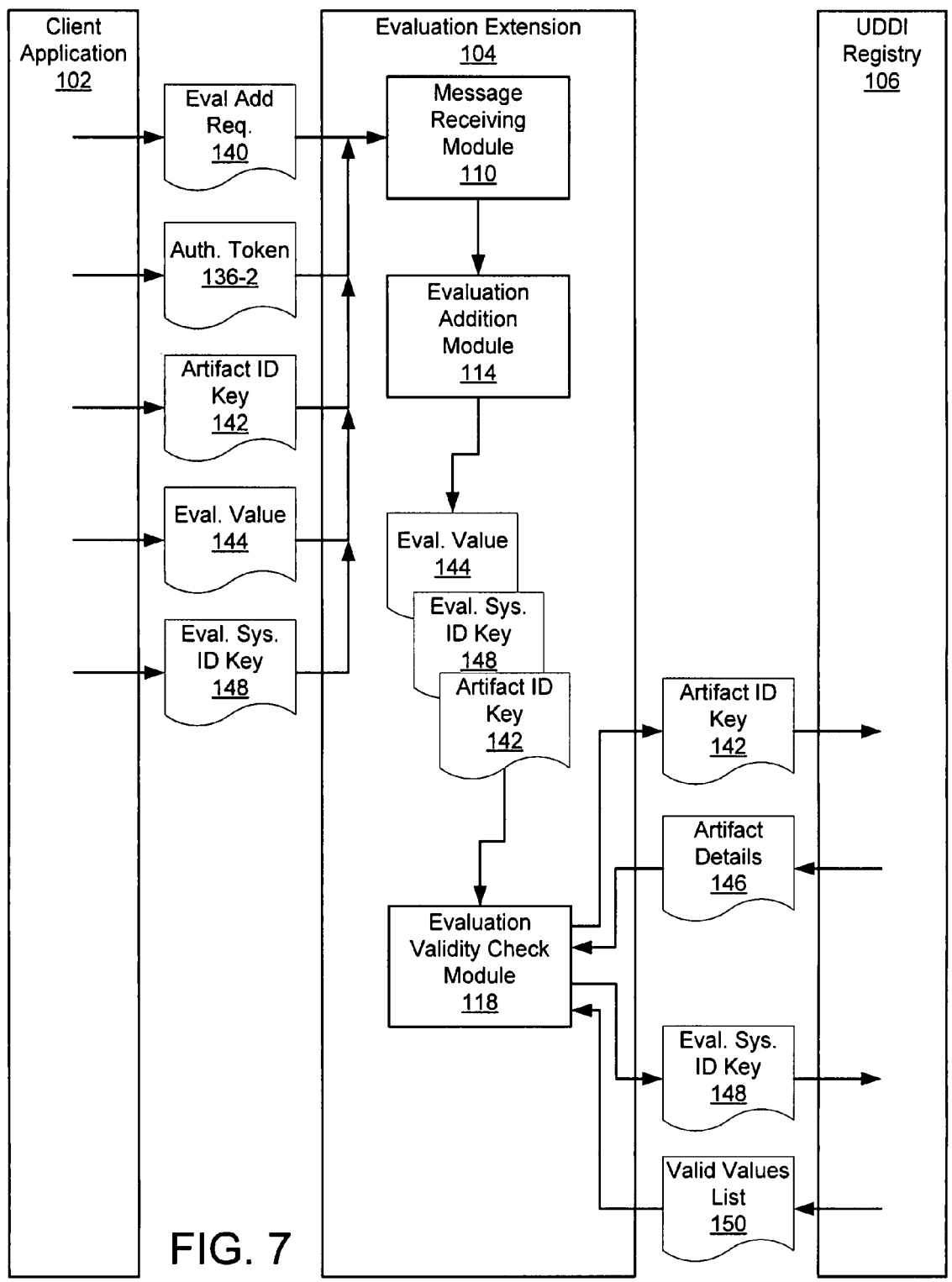
FIG. 7 shows the function of an Evaluation Validity Check Module, a component of the Evaluation Extension.

FIG. 7 shows the function of an Evaluation Validity Check Module, a component of the Evaluation Extension. In one embodiment, the Evaluation Extension 104 has an Evaluation Validity Check Module 118. The Evaluation Addition Module 114 sends the Artifact Identifying Key 142 that it received from the Client 102 to the Evaluation Validity Check Module 118, which forwards the Key 142 to the Registry 106 in a request for details on the artifact. If the Registry responds back with a message containing Artifact Details 146, then the Evaluation Validity Check Module 118 determines that the existence in the Registry 106 of an artifact matching the Key 142 has been confirmed.

The Evaluation Addition Module 114 sends the Evaluation Value 144 and the Evaluation System Identifying Key 148 that it received from the Client 102 to the Evaluation Validity Check Module 118. In some embodiments, the Registry 106 has one or more evaluation systems stored as t-models. In these embodiments, the Evaluation Validity Check Module 118 forwards the Evaluation System Identifying Key 148 to the Registry 106 in a request for all valid values in the corresponding evaluation system. If the Registry responds back with a message containing a Valid Values List 150, and if the Evaluation Value 144 sent by the Client 102 matches one of the values in the Valid Values List 150, then the Evaluation Validity Check Module 118 determines that the Evaluation Value 144 is valid. In other embodiments, the evaluation systems are not stored in the Registry 106 but rather in the Evaluation Extension 104. In these embodiments, the Evaluation Validity Check Module 118 checks with the Evaluation Extension for an evaluation system corresponding to the Evaluation System Identifying Key 148. If a corresponding evaluation system is found, and if the Evaluation Value 144 sent by the Client 102 matches one of the valid values in the corresponding evaluation system, then the Evaluation Validity Check Module 118 determines that the Evaluation Value 144 is valid. If the existence in the Registry 106 of an artifact matching the Artifact Identifying Key 142 has been confirmed and if the Evaluation Value 144 has been determined to be valid, then the Evaluation Validity Check Module 118 determines that the Evaluation Addition Request 140 is valid.

Figure 8:
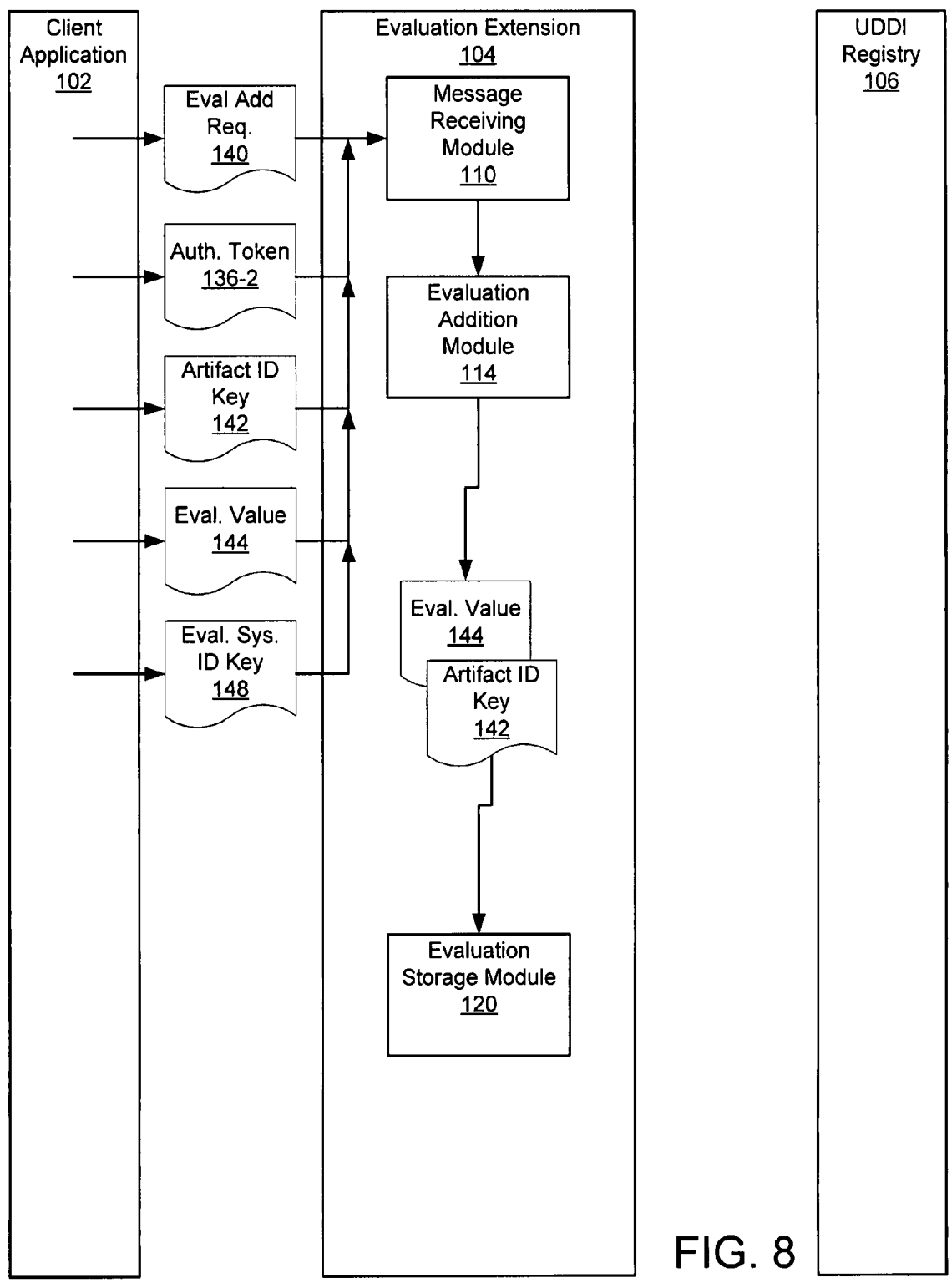
FIG. 8 shows the function of an Evaluation Storage Module, a component of the Evaluation Extension.

FIG. 8 shows the function of an Evaluation Storage Module, a component of the Evaluation Extension. In one embodiment, the Evaluation Extension 104 has an Evaluation Storage Module 120. If the Evaluation Addition Request 140 has been determined to be authorized and valid, then the Evaluation Addition Module 114 sends the Artifact Identifying Key 142 and the Evaluation Value 144 to the Evaluation Storage Module 120, which associates the Artifact Identifying Key 142 and the Evaluation Value 144 and stores the associated pair. In some embodiments the Evaluation Addition Module 114 sends the Evaluation System Model Identifying Key 148 to the Evaluation Storage Module 120 to be associated and stored with the Artifact Identifying Key 142 and the Evaluation Value 144. In some embodiments the Evaluation Addition Module 114 sends a user identifying key extracted from the Authorization Token 136-1 the to the Evaluation Storage Module 120 to be associated and stored with the Artifact Identifying Key 142 and the Evaluation Value 144.

Figure 9:
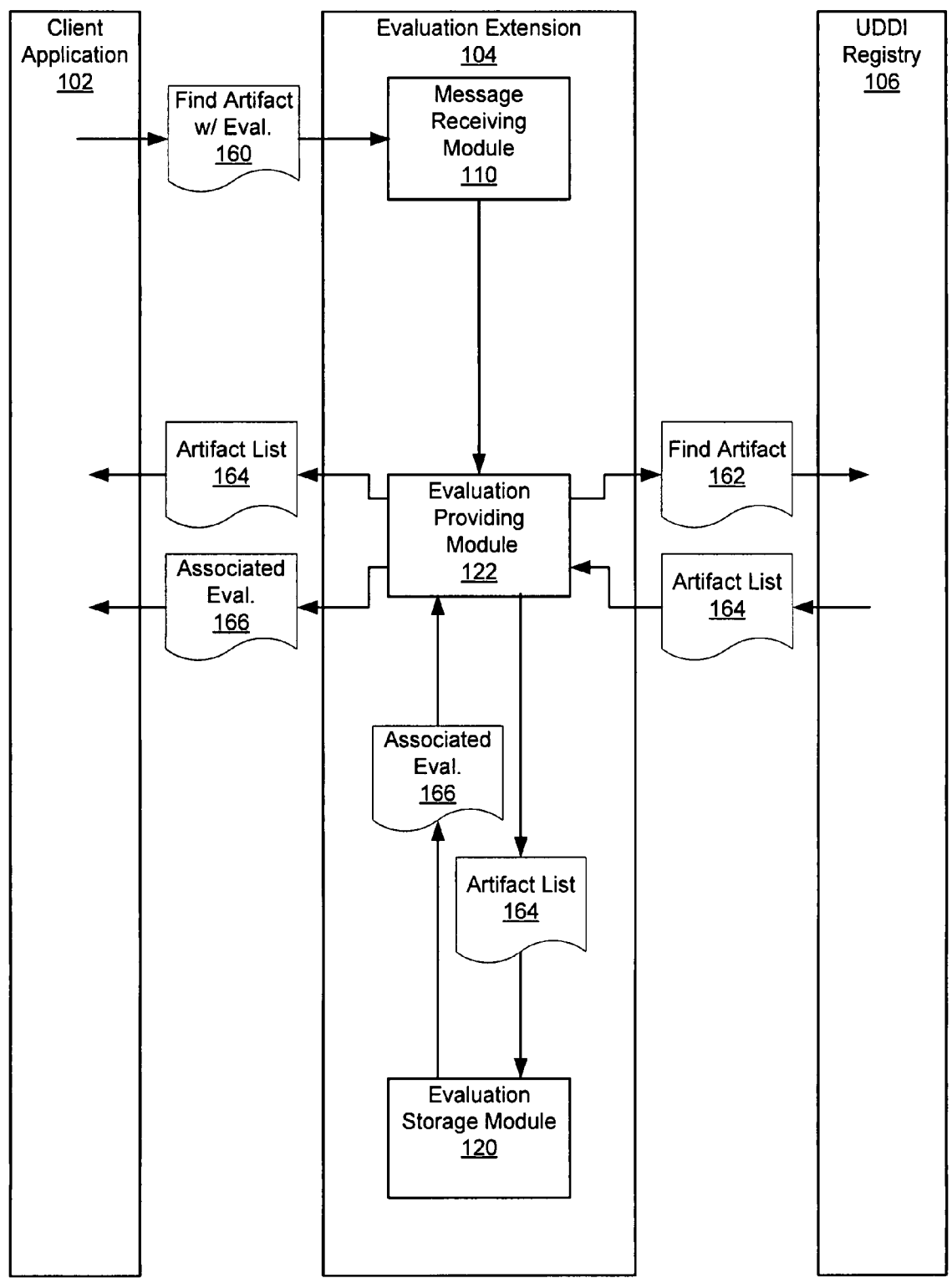
FIG. 9 shows the function of an Evaluation Providing Module, a component of the Evaluation Extension.

FIG. 9 shows the function of an Evaluation Providing Module, a component of the Evaluation Extension. In one embodiment, the Evaluation Extension 104 has an Evaluation Providing Module 122. The Client 102 may request the stored evaluations of UDDI v3 registry artifacts by sending to the Registry 106 a standard UDDI v3 find request that is modified to include an evaluation qualifier. The Message Receiving Module 110 determines the Find Artifact with Evaluation Qualifier Request 160 is a message regarding evaluations and sends it to the Evaluation Providing Module 122. The Evaluation Providing Module 122 redacts the evaluation qualifier from the Request 160 to form a Redacted Find Artifact Request 162, which is sent to the Registry 106. The Registry 106 returns an Artifact List 164 with identifying keys of any artifacts matching the requirements specified in the Redacted Request 162. The Evaluation Providing Module 122 sends the Artifact List 164 to the Evaluation Storage Module 120 which retrieves any stored evaluations associated with any of the artifact identifying keys in the Artifact List 164. These Associated Evaluations 166 are sent to the Evaluation Providing Module 122 which forwards them to the Client 102 along with the Artifact List 164. In some embodiments, the Artifact List 164 is reordered by the Evaluation Providing Module 122 according to the Associated Evaluations 166 before the Artifact List 164 is sent to the Client 102. In some embodiments, only a reordered Artifact List 164 is sent to the Client 102 and the Associated Evaluations are not sent. In some embodiments, artifacts in the Artifact List 164 that the Evaluation Storage Module 120 finds no evaluations for is removed from the Artifact List 164 before the Artifact List 164 is sent to the Client 102.

FIG. 10 shows an example of a Request to find artifacts with evaluations. A portion of a standard UDDI v3 request 190 to find a specified type of UDDI v3 article—web services—is shown with a findQualifier 192 that has a value 194 of "uddi:evaluation:quality". All UDDI v3 compliant client applications should be able to make this request. A UDDI v3 server would recognize this request, but would not know how to handle this particular findQualifer value 194. A Redacted Find Request 196 comprises the Find Request 190 with the evaluation qualifier 192 removed.

Figure 11:
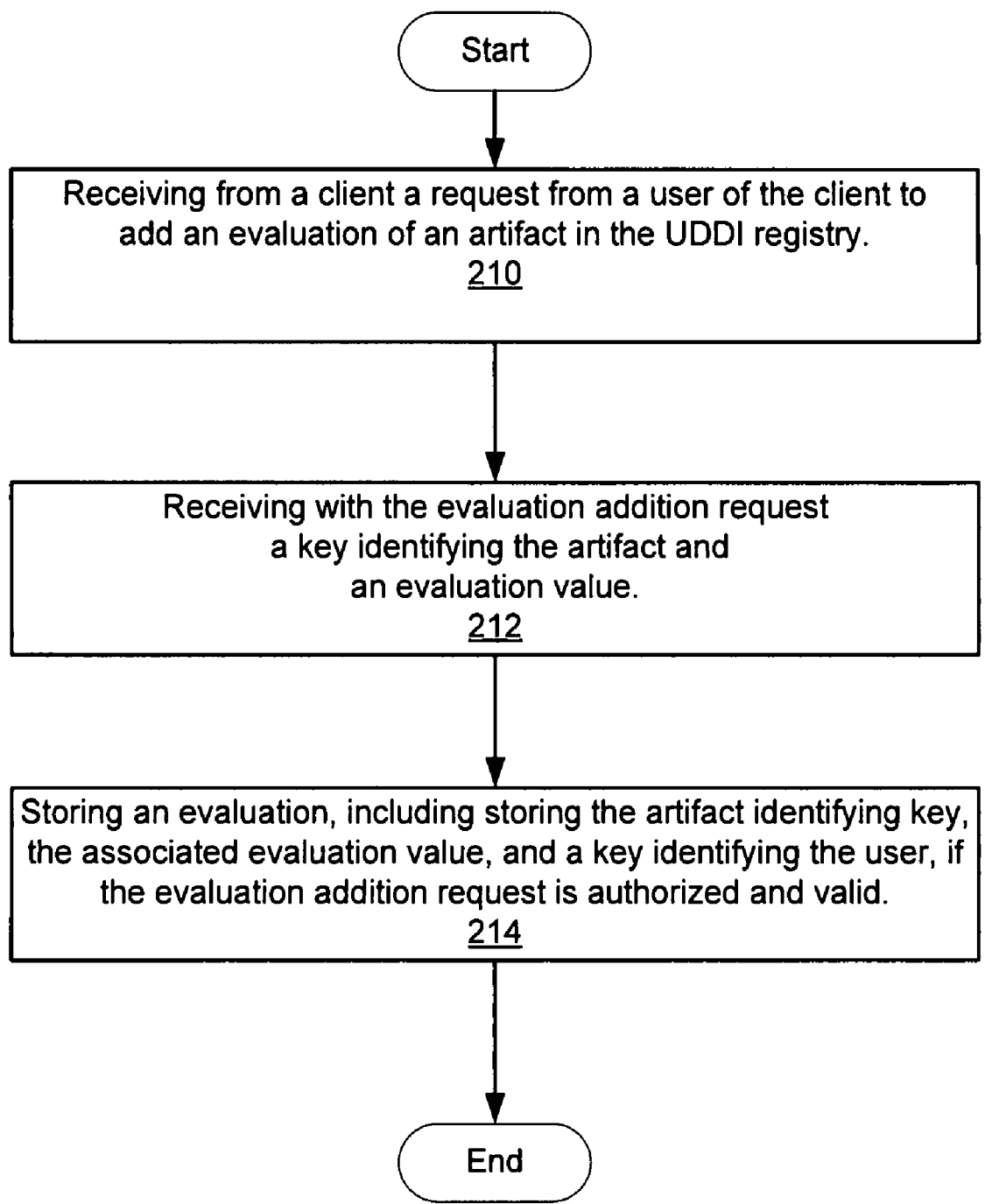
FIG. 11 shows a flowchart for an embodiment of a method for an extension to a Universal Description Discovery and Integration (UDDI) v3 registry to maintain evaluations of artifacts in the registry.

FIG. 11 shows a flowchart for an embodiment of a method for an extension to a Universal Description Discovery and Integration (UDDI) v3 registry to maintain evaluations of artifacts in the registry. One stage 210 of the method comprises receiving from a client an evaluation addition request to add an evaluation of an artifact in the UDDI v3 registry. A second stage 212 includes receiving from the client an artifact identifying key and an evaluation value associated with the artifact identifying key. In one embodiment, the artifact identifying key and an evaluation value associated with the artifact identifying key are sent in the same message as the evaluation addition request. In another embodiment, the artifact identifying key and an evaluation value associated with the artifact identifying key are sent in one or more different messages. A third stage 214 includes storing an evaluation, including storing the artifact identifying key and the associated evaluation value, if the evaluation addition request is authorized and valid. In one embodiment, a key identifying the user who requested the evaluation addition is associated with the artifact identifying key and associated evaluation value and stored with them.

Figure 12:
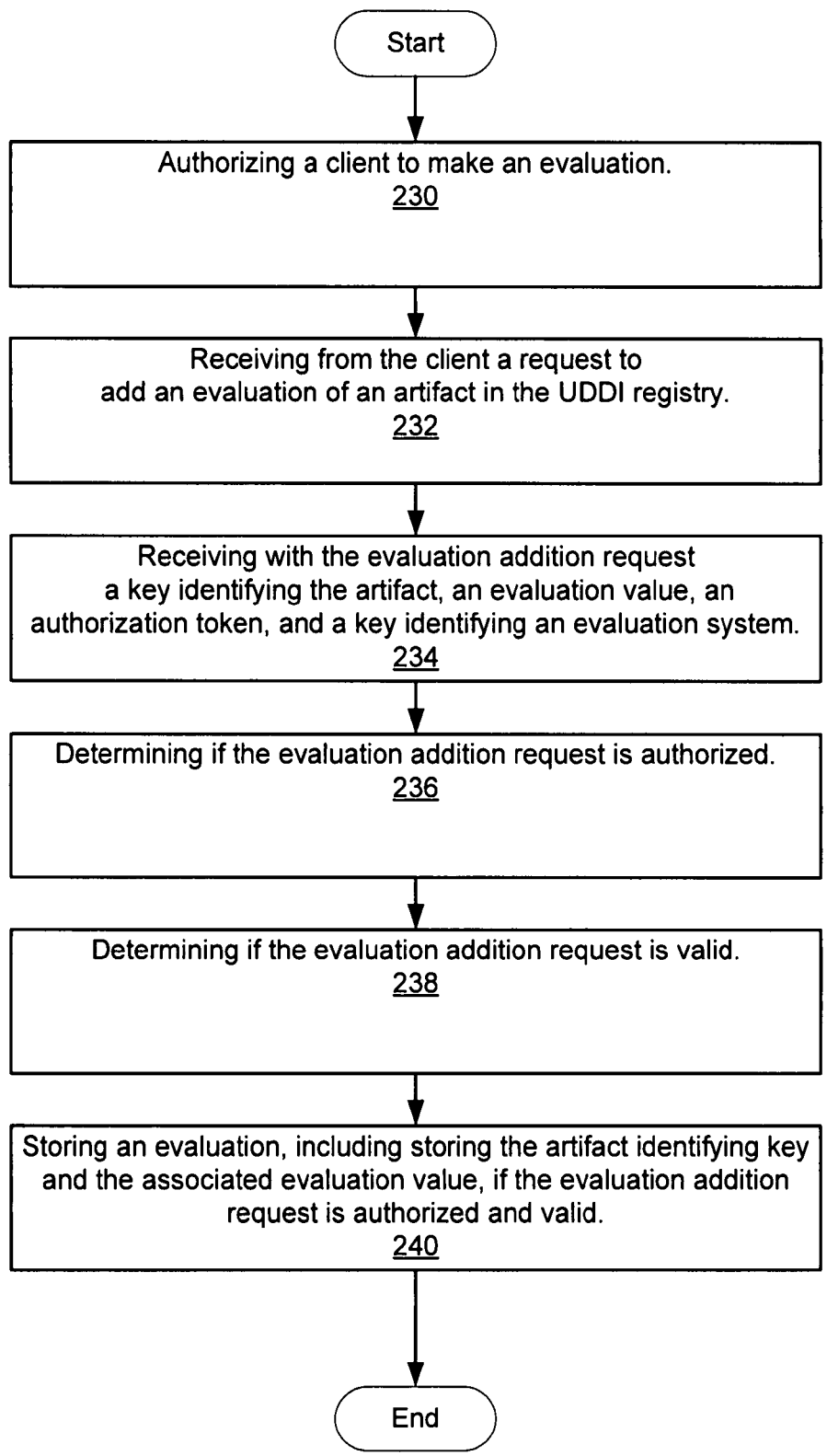
FIG. 12 shows a flowchart for a second embodiment of a method for a UDDI v3 registry to maintain evaluations of artifacts in the registry.

FIG. 12 shows a flowchart for a second embodiment of a method for a UDDI v3 registry to maintain evaluations of artifacts in the registry. One stage 230 of the method comprises authorizing a client to make an evaluation. A second stage 232 includes receiving from a client an evaluation addition request to add an evaluation of an artifact in the UDDI v3 registry. In some embodiments, more than one evaluation addition request can be made per message sent by the client. A third stage 234 includes receiving with the evaluation addition request additional information items including an artifact identifying key, an evaluation value to be associated with the artifact identifying key, an authorization token, and a key identifying an evaluation system. In one embodiment, the additional information items are sent in the same message as the evaluation addition request. In another embodiment, the additional information are sent in one or more different messages. A fourth stage 236 includes determining if the evaluation addition request is authorized. A five stage 238 includes determining if the evaluation addition request is valid. A sixth stage 240 includes storing an evaluation, including storing the artifact identifying key and the associated evaluation value, if the evaluation addition request is authorized and valid.

Figure 13:
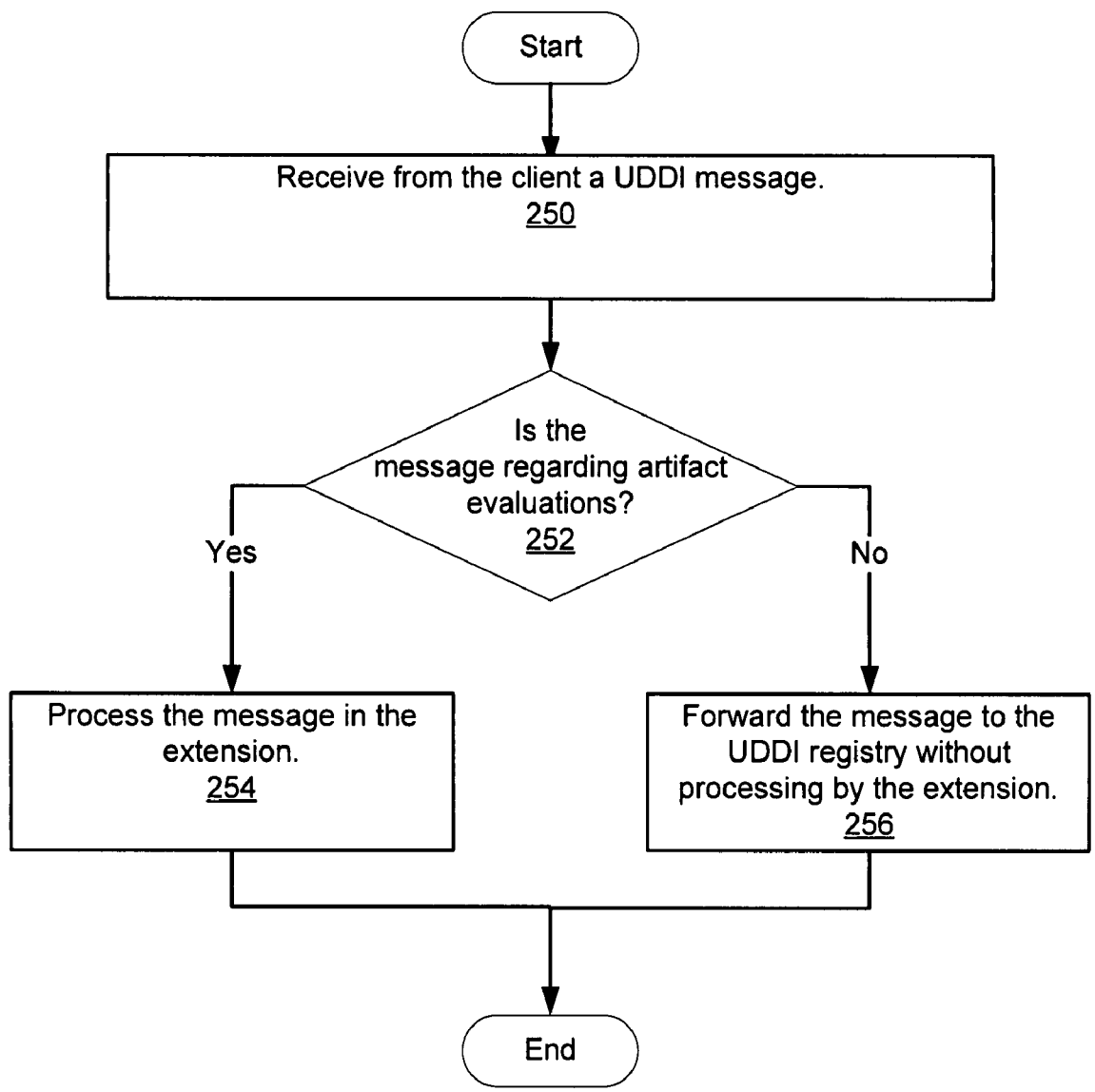
FIG. 13 shows a flowchart for a method for an extension to a UDDI v3 registry to monitor messages to the registry.

FIG. 13 shows a flowchart for a method for an extension to a UDDI v3 registry to monitor messages to the registry. A first stage 250 of the method includes receiving from the client a UDDI v3 message. A second stage 252 includes determining if any of the message contents is regarding artifact evaluations. A third stage 254 includes processing the message in the extension. The third stage 254 is only performed if the message has contents that regard artifact evaluations. A fourth stage 256 includes forwarding the message to the registry without further processing by the extension. The fourth stage 256 is only performed if the message does not have contents that regard artifact evaluations.

Figure 14:
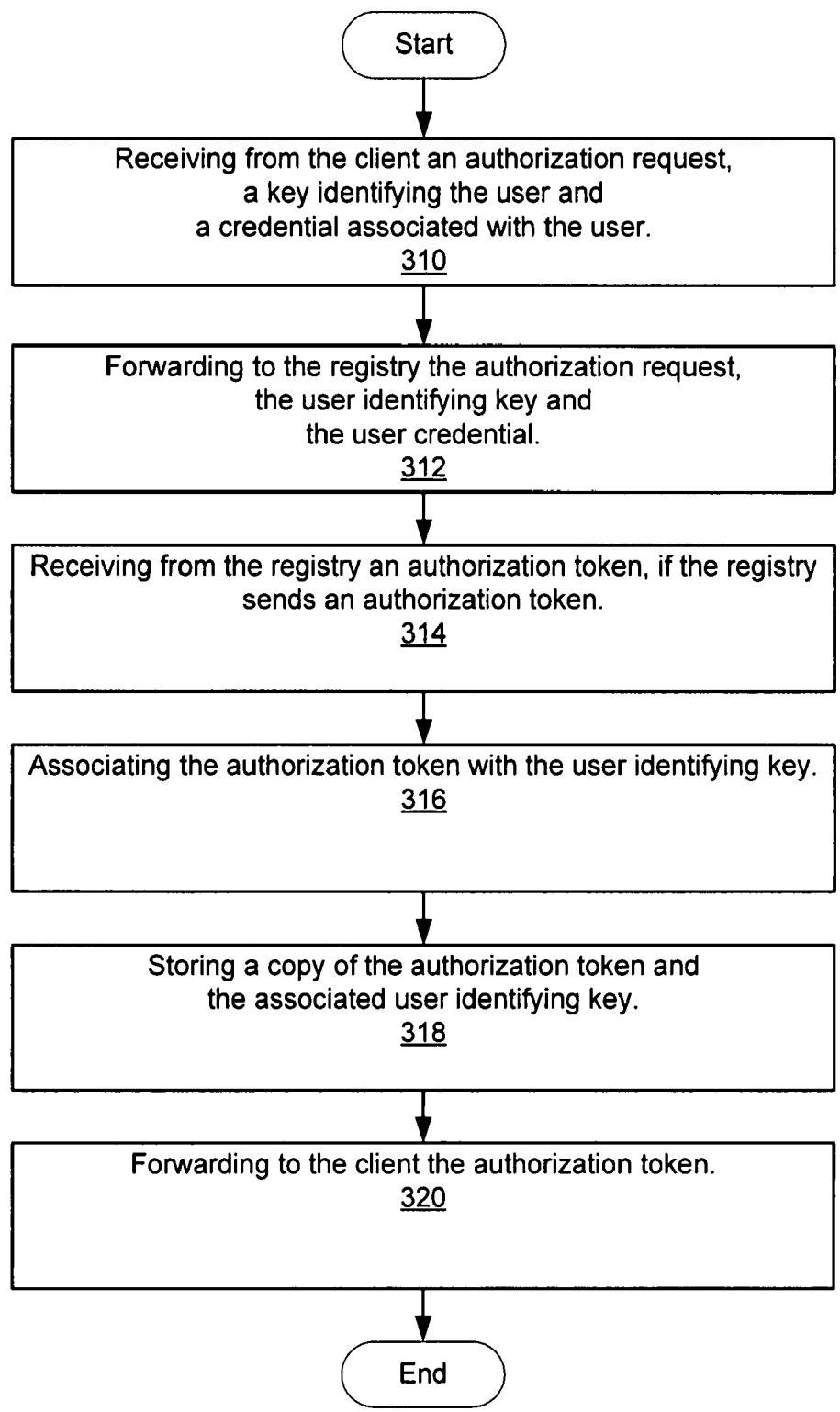
FIG. 14 shows a flowchart for a method for an extension to a UDDI v3 registry to authorize a client application to make an evaluation.

FIG. 14 shows a flowchart for a method for an extension to a UDDI v3 registry to authorize a client application to make an evaluation. This method is one embodiment for a detailed method of carrying out the first stage 230 of the method shown in FIG. 12. A first stage 310 includes receiving from the client application an authorization request, a user identifying key and a credential associated with a user of the client application. In some embodiments this request may be in the form of a standard UDDI v3 get_auth_Token request. A second stage 312 includes forwarding to the registry the authorization request, the user identifying key and the user credential. A third stage 314 includes receiving from the registry an authorization token, if the registry sent an authorization token. In some cases, the registry will deny the request for authorization and send an error message indicating that the provided pair user identifying key and credentials is invalid for the request. If such an error message is received, the extension stops processing the request and the remainder of this method is not performed. A fourth stage 316 includes associating the first authorization token with the user identifying key. A fifth stage 318 includes storing the first authorization token and associated user identifying key. A sixth stage 320 includes forwarding to the client the first authorization token.

Figure 15:
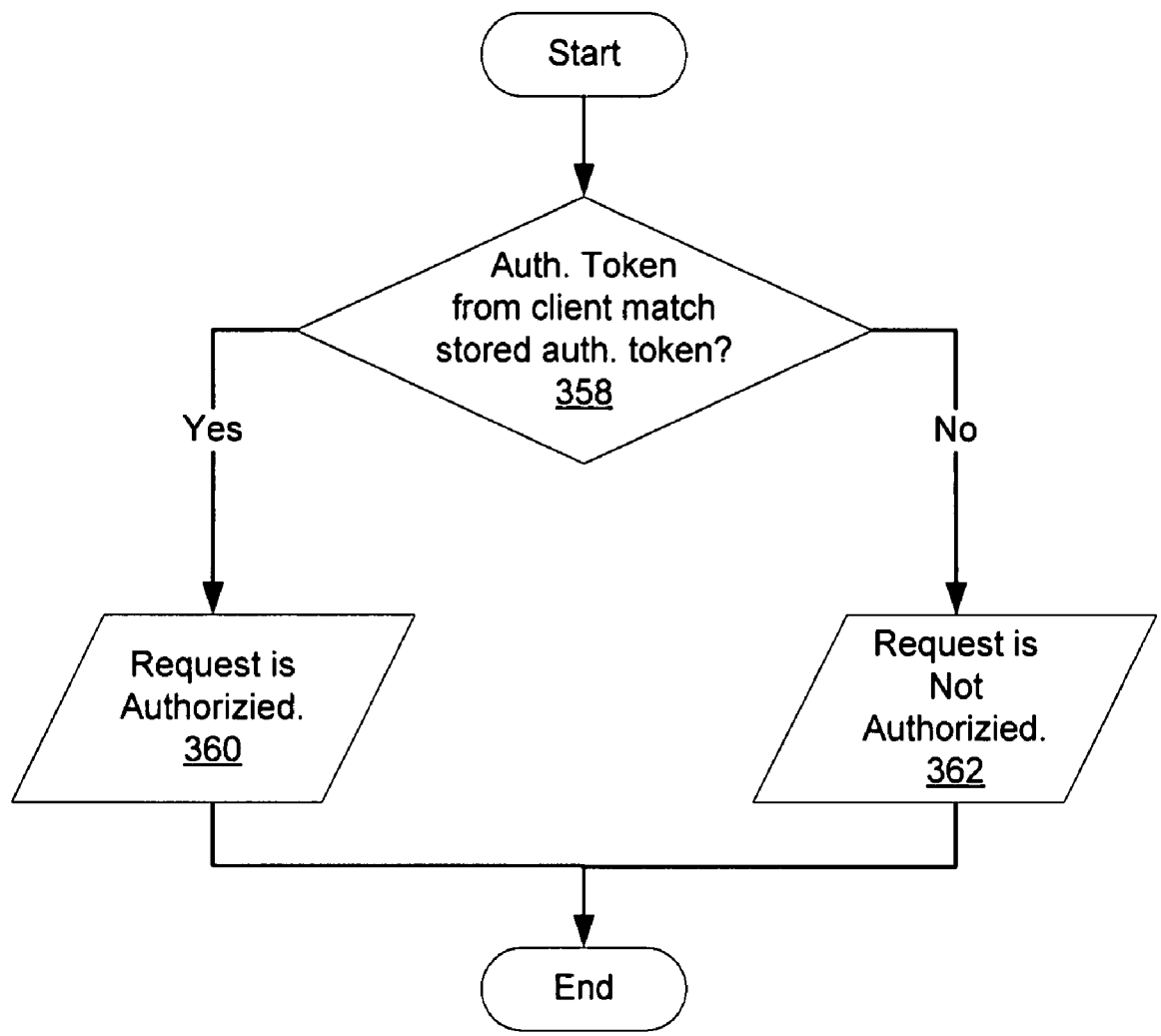
FIG. 15 shows a flowchart for a method for an for an extension to a UDDI v3 registry to determine if an evaluation addition request from a client is authorized.

FIG. 15 shows a flowchart for a method for an for an extension to a UDDI v3 registry to determine if an evaluation addition request from a client is authorized. This method is one embodiment for a detailed method of carrying out the fourth stage 236 of the method shown in FIG. 12. A first stage 358 includes deciding if an authorization token received from a client matches a stored authorization token previously received from the UDDI v3 registry. If the received token matches a stored token, then the request is authorized. If the received token does not match a stored token, then the request is not authorized.

Figure 16:
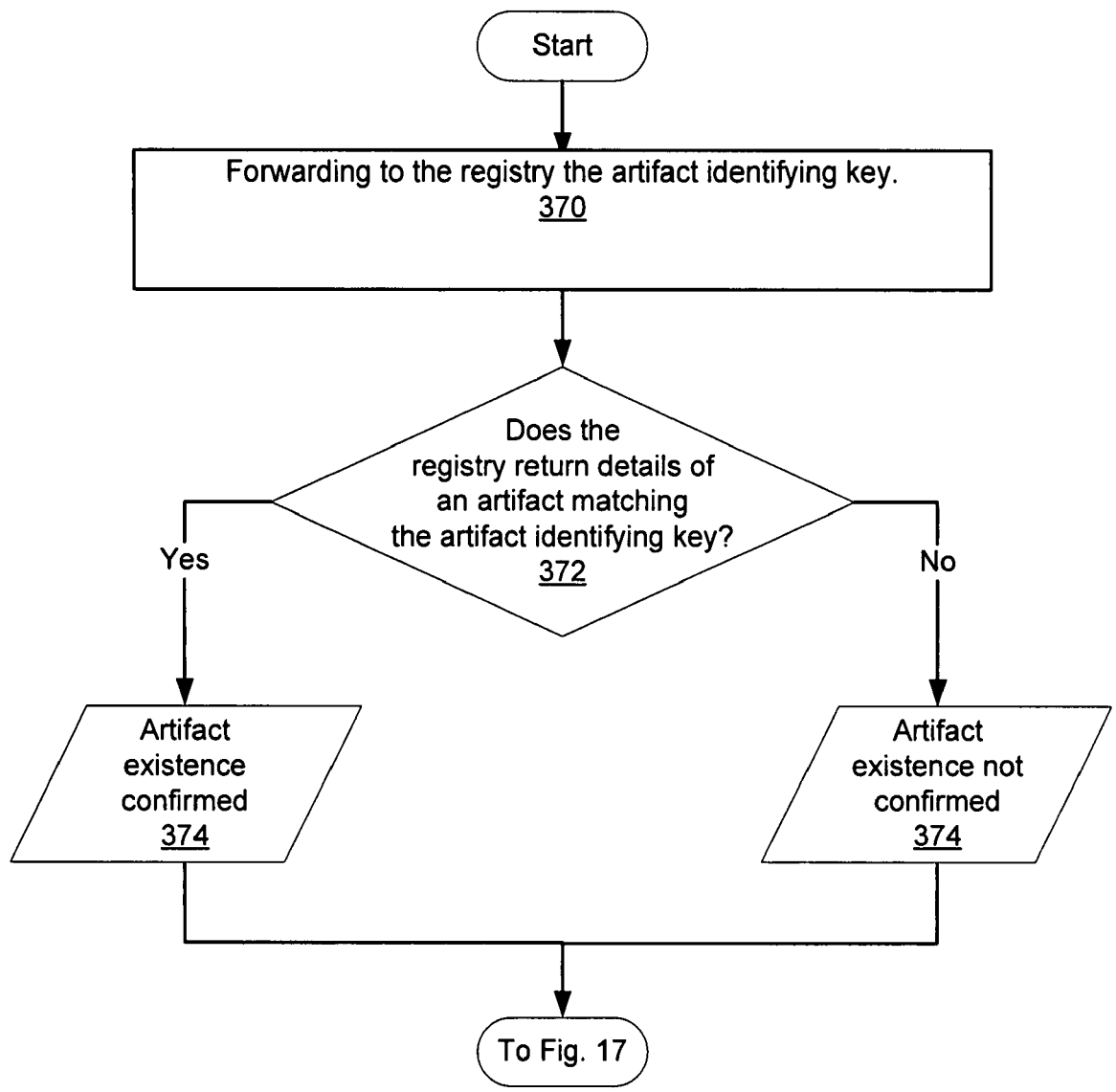
FIGS. 16 and 17 show a flowchart for a method for an for an extension to a UDDI v3 registry to determine if an evaluation addition request from a client is valid.
Figure 17:
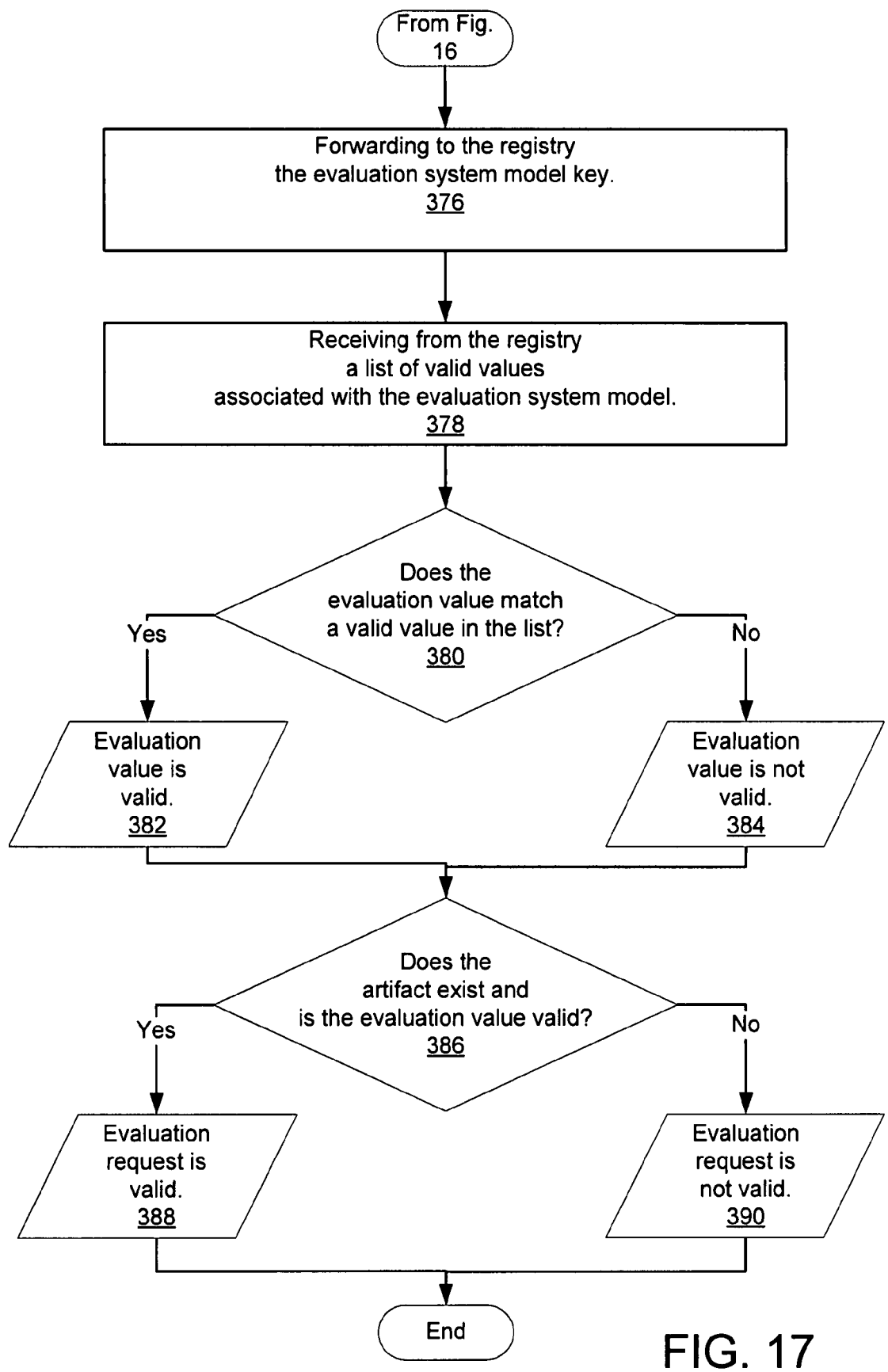

FIGS. 16 and 17 show a flowchart for a method for an for an extension to a UDDI v3 registry to determine if an evaluation addition request from a client is valid. This method is one embodiment for a detailed method of carrying out the fifth stage 237 of the method shown in FIG. 12. A first stage 370 includes forwarding to the registry a request for details about a registry artifact, the request including an artifact identifying key received from the client. A second stage 372 includes deciding if any of the details of a return message from the registry match the sent artifact identifying key. If any of the details of the return match the artifact identifying key, then the existence of the artifact corresponding to the key is confirmed. If none of the details of the return match the artifact identifying key or if the registry does not supply a return message, then a the existence of the artifact corresponding to the key is not confirmed. A third stage 376 includes forwarding to the registry a request for a list of valid values from an evaluation system saved as a t-model in the registry, the evaluation system identified with an evaluation system model key received from the client and sent with the request. A fourth stage 378 includes receiving from the registry a list of valid values associated with the evaluation system model. A fifth stage 380 includes deciding whether an evaluation value sent by the client to be associated with the registry artifact match one of the values in the list of valid values. If the evaluation value matches one of the values in the list, then the evaluation value is valid. If the evaluation value does not match one of the values in the list, then the evaluation value is not valid. A sixth stage 386 includes deciding if the evaluation request is authorized by deciding if the artifact exists and if the evaluation value is valid. If the artifact has been determined to exist and the evaluation value has been determined to be valid, then the evaluation request is valid. If the artifact has not been determined to exist or the evaluation value has not been determined to be valid, then the evaluation request is not valid.

Figure 18:
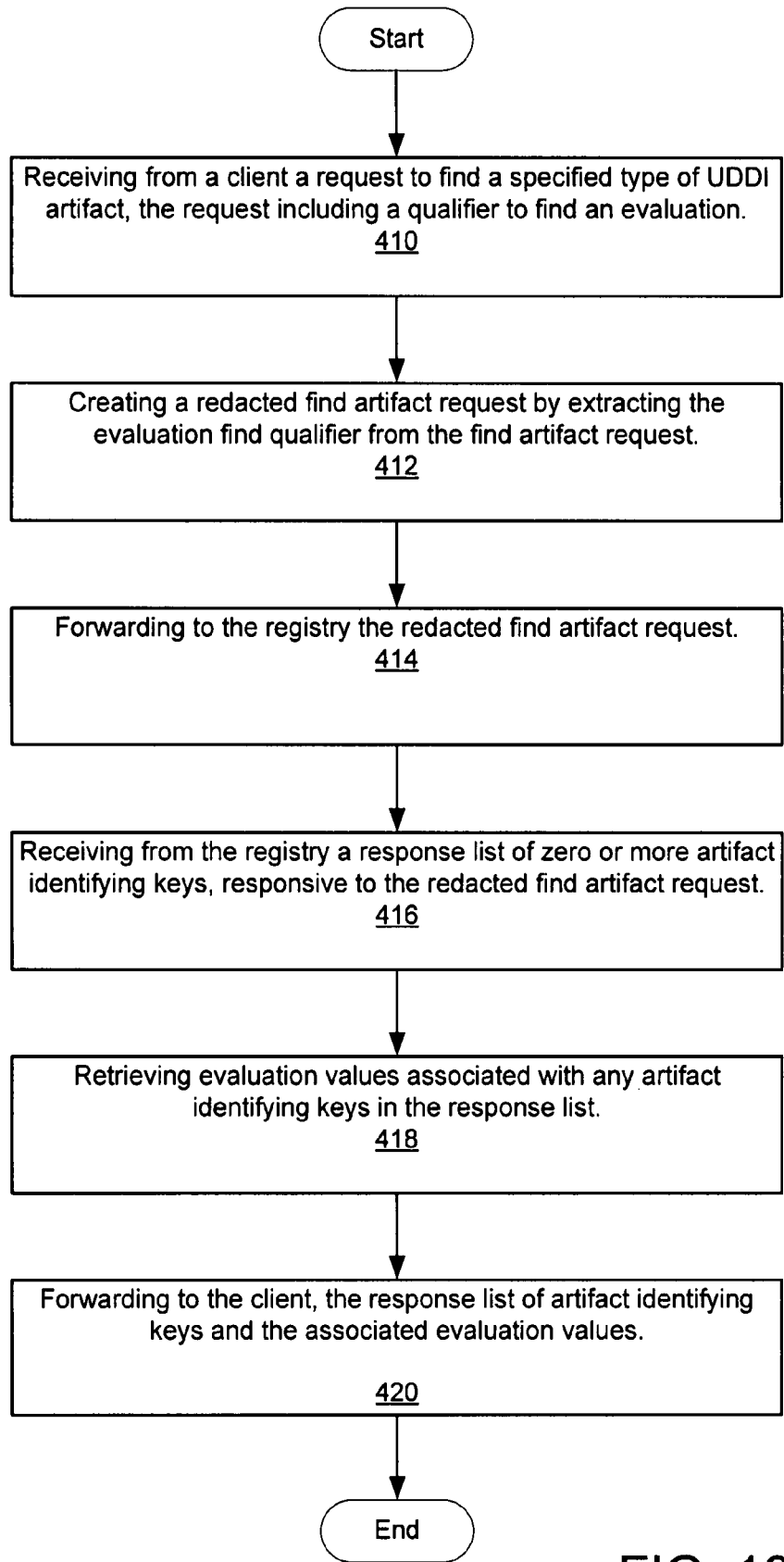
FIG. 18 shows a flowchart for a method for an for an extension to a UDDI v3 registry to provided a stored evaluation of a UDDI v3 artifact in the registry in response to a request from a client.

FIG. 18 shows a flowchart for a method for an for an extension to a UDDI v3 registry to provided a stored evaluation of a UDDI v3 artifact in the registry in response to a request from a client. A first stage 410 includes receiving from the client a request to find a specified type of UDDI v3 artifact, the request including a find qualifier regarding evaluations. A second stage 412 includes creating a redacted find artifact request by extracting the evaluation find qualifier from the find artifact request. A third stage 414 includes forwarding the redacted find artifact request to the registry. A fourth stage 416 includes receiving from the registry a response list of zero or more artifact identifying keys, responsive to the redacted find artifact request. A fifth stage 418 includes retrieving evaluation values associated with any artifact identifying keys in the response list. A sixth stage 420 includes forwarding to the client, the response list of artifact identifying keys and the associated evaluation values.

Figure 19:
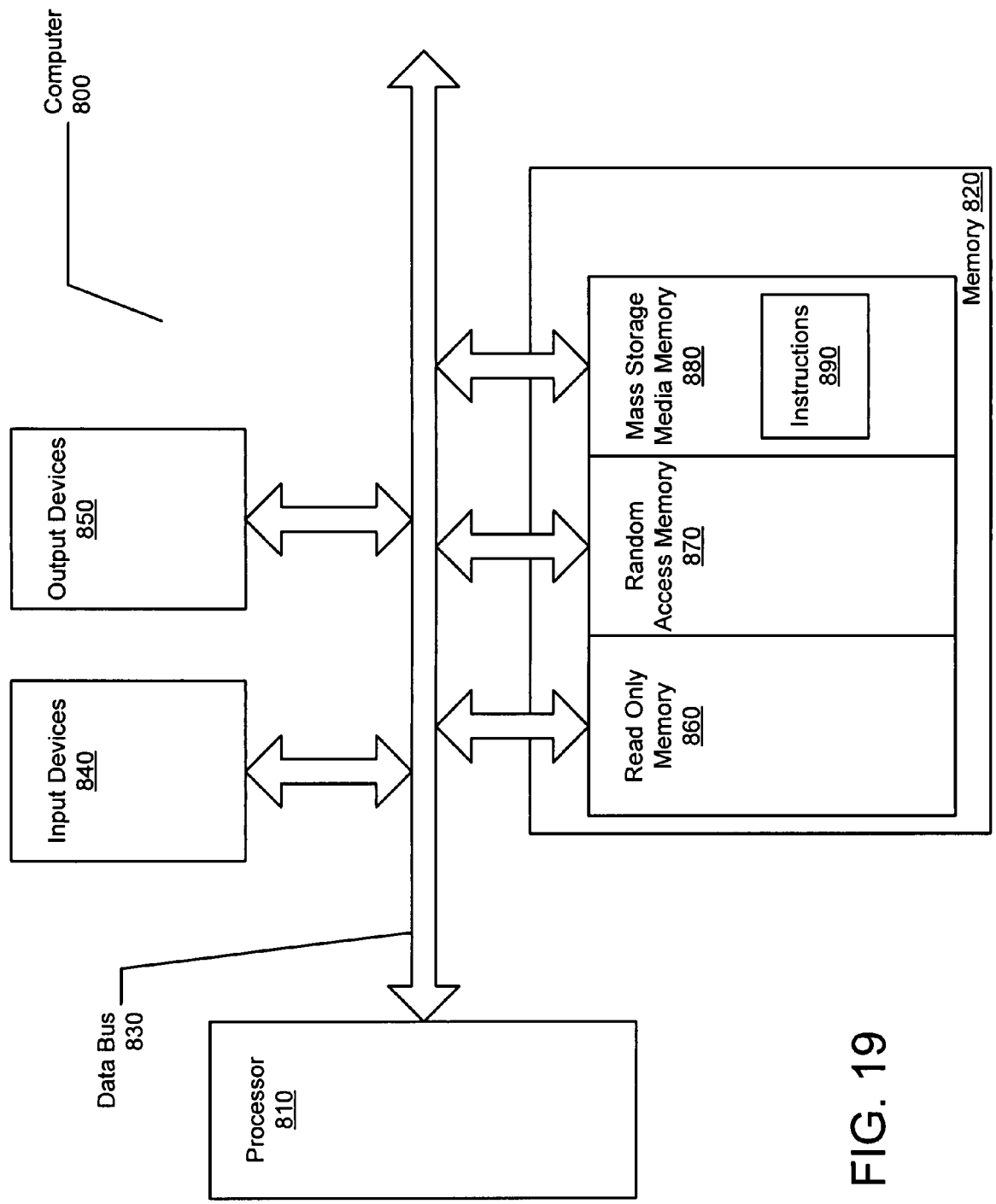
FIG. 19 shows an embodiment including instructions on a tangible machine accessible medium.

FIG. 19 shows an embodiment including instructions on a tangible machine accessible medium. One embodiment of the invention includes instructions 890 placed on a tangible machine-accessible medium, which when accessed by a machine cause the machine to execute the instructions to carry out the methods described herein. A tangible machine-accessible medium includes any mechanism that stores information in a form accessible by a machine (e.g., a computer 800, network device, personal digital assistant, manufacturing tool, any device with a set of one or more processors, etc.). For example, a tangible machine-accessible medium includes reusable and non-reusable media (e.g., read only memory (ROM) 860; random access memory (RAM) 870; mass storage media memory 880 such as magnetic disk storage media; optical storage media; flash memory devices; etc.).

APPENDIX

```
<?xml version="1.0" encoding="UTF-8" standalone="no"?>
<xsd:schema xmlns:uddi="urn:uddi-org:api_v3"
    xmlns:uddi_eval="urn:uddi-sap-com:eval_api"
    xmlns:xsd="http://www.w3.org/2001/XMLSchema"
    targetNamespace="urn:uddi-sap-com:eval_api"
    elementFormDefault="qualified"
    attributeFormDefault="unqualified">
    <xsd:import namespace="http://www.w3.org/XML/1998/namespace"/>
    <xsd:import namespace="urn:uddi-org:api_v3"
        schemaLocation="uddi_v3.xsd"/>
    <xsd:element name="add_evaluation">
        <xsd:complexType>
            <xsd:sequence>
                <xsd:element ref="uddi:authInfo"/>
                <xsd:element ref="uddi_eval:entity_evaluations"
                    maxOccurs="unbounded"/>
            </xsd:sequence>
        </xsd:complexType>
    </xsd:element>
    <xsd:element name="entity_evaluations">
        <xsd:complexType mixed="true">
            <xsd:sequence>
                <xsd:element name="business_service" minOccurs = "0"
                    maxOccurs="unbounded">
                    <xsd:complexType>
                        <xsd:sequence>
                            <xsd:element
                                ref="uddi _eval:evaluations"/>
                        </xsd:sequence>
                        <xsd:attribute name="key"
                            type="uddi:uddiKey"/>
                    </xsd:complexType>
                </xsd:element>
                <xsd:element name="business_entity" minOccurs = "0"
                    maxOccurs="unbounded">
                    <xsd:complexType>
                        <xsd:sequence>
                            <xsd:element
                                ref="uddi_eval:evaluations"/>
                        </xsd:sequence>
                        <xsd:attribute name="key"
                            type="uddi:uddiKey"/>
                    </xsd:complexType>
                </xsd:element>
                <xsd:element name="t_Model" minOccurs = "0"
                    maxOccurs="unbounded">
                    <xsd:complexType>
                        <xsd:sequence>
                            <xsd:element
                                ref="uddi_eval:evaluations"/>
                        </xsd:sequence>
                        <xsd:attribute name="key"
                            type="uddi:uddiKey"/>
                    </xsd:complexType>
                </xsd:element>
                <xsd:element name="binding_Template" minOccurs = "0"
                    maxOccurs="unbounded">
                    <xsd:complexType>
                        <xsd:sequence>
                            <xsd:element
                                ref="uddi_eval:evaluations"/>
                        </xsd:sequence>
                        <xsd:attribute name="key"
                            type="uddi:uddiKey"/>
                    </xsd:complexType>
                </xsd:element>
                <xsd:element name="publisher_assertion" minOccurs = "0"
                    maxOccurs="unbounded">
                    <xsd:complexType>
                        <xsd:sequence>
                            <xsd:element
                                ref="uddi_eval:evaluations"/>
                        </xsd:sequence>
                        <xsd:attribute name="key"
                            type="uddi:uddiKey"/>
                    </xsd:complexType>
                </xsd:element>
            </xsd:sequence>
        </xsd:complexType>
    </xsd:element>
    <xsd:element name="evaluations">
        <xsd:complexType>
            <xsd:sequence>
                <xsd:element ref="uddi_eval:evaluation"
                    maxOccurs="unbounded"/>
            </xsd:sequence>
        </xsd:complexType>
    </xsd:element>
    <xsd:element name="evaluation">
        <xsd:complexType>
            <xsd:complexContent>
                <xsd:restriction base="xsd:anyType">
                    <xsd:attribute name="tModelKey"
                        type="xsd:string" use="required"/>
                    <xsd:attribute name="value" type="xsd:string"
                        use="required"/>
                    <xsd:attribute name="name" type="xsd:string"
                        use="required"/>
                </xsd:restriction>
            </xsd:complexContent>
        </xsd:complexType>
    </xsd:element>
</xsd:schema>
```

What is claimed is:

1. A method for an extension to a platform independent registry to maintain evaluations of artifacts in the registry, the method comprising:

receiving from a client a request to add an evaluation of an artifact in the registry;

receiving from the client a key identifying the artifact and an evaluation value associated with the artifact identifying key;

receiving with the evaluation addition request a key identifying an evaluation system model;

determining the evaluation addition request is valid if the registry has an artifact matching the artifact identifying key and if the requested evaluation value matches a value in a list of valid evaluation values associated with an evaluation system model matching the evaluation system model identifying key; and storing an evaluation, including storing the artifact identifying key and the associated evaluation value, if the evaluation addition request is authorized and valid.

2. The method of claim 1, further comprising:

authorizing the client to make the evaluation addition request.

3. The method of claim 2, wherein authorizing the client to make the evaluation addition request further comprises:

receiving from the client a request for authorization, a key identifying a user of the client, and a credential associated with the user;
forwarding to the registry the authorization request, the user identifying key, and the user credential;
receiving from the registry an authorization token;
associating the authorization token with the user identifying key;
storing a copy of the authorization token and associated user identifying key; and
forwarding to the client the authorization token.

4. The method of claim 3, further comprising:
receiving with the evaluation addition request an authorization token; and
determining the evaluation addition request is authorized if the authorization token received with the addition request matches the stored authorization token copy, else determining the evaluation addition request is not authorized.

5. The method of claim 2, wherein storing the evaluation further comprises storing the user identifying key.

6. The method of claim 1, wherein storing the evaluation further comprises storing the evaluation system identifying key.

7. The method of claim 6, further comprising:
forwarding to the registry the artifact identifying key;
receiving, if the registry has the artifact matching the artifact identifying key, details of the matching registry artifact;
forwarding to the registry the evaluation system model key; and
receiving from the registry the list of valid values associated with the evaluation system model.

8. The method of claim 1, further comprising:
receiving from the client messages regarding artifact evaluations and messages not regarding such evaluations; and
forwarding to the registry without processing by the extension, messages not regarding artifact evaluations.

9. The method of claim 1, wherein the registry is compliant with the Universal Description Discovery and Integration (UDDI) version 3 standard.

10. An apparatus to maintain evaluations of artifacts in a platform independent registry, the apparatus comprising:
an evaluation addition module to receive from a client, using one or more processors, a request to add an evaluation of an artifact in the registry, a key identifying the artifact, and an evaluation value associated with the artifact identifying key;
an evaluation validity check module,
to receive with the evaluation addition request an evaluation system model identifying key,
to determine the evaluation addition request is valid if the registry has an artifact matching the artifact identifying key and if the requested evaluation value matches a value in a list of valid evaluation values associated with an evaluation system model matching the evaluation system model identifying key; and
an evaluation storage module to save the artifact identifying key and the associated evaluation value, if the evaluation addition request is authorized and valid.

11. The apparatus of claim 10, further comprising:
an evaluation authorization issue module,
to receive from the client a request for authorization, a key identifying a user of the client and a credential associated with the user,
to forward to the registry the authorization request, the user identifying key and the user credential,
to receive from the registry an authorization token;
to associate the authorization token with the user identifying key;
to store a copy of the authorization token and associated user identifying key, and
to forward to the client the authorization token.

12. The apparatus of claim 11, further comprising:
an evaluation authorization check module
to receive with the evaluation addition request an authorization token, and
to determine the evaluation addition request is authorized if the authorization token received with the addition request matches the stored authorization token copy, else to determine the evaluation addition request is not authorized.

13. The apparatus of claim 10, wherein the evaluation validity check module further to:
forward to the registry the artifact identifying key;
receive, if the registry has the artifact matching the artifact identifying key, details of the matching registry artifact;
forward to the registry the evaluation system model identifying key; and
receive from the registry the list of valid values associated with the evaluation system model.

14. The apparatus of claim 10, further comprising:
a message receiving module,
to receive from the client messages regarding artifact evaluations and messages not regarding such evaluations; and
forwarding to the registry without processing by the apparatus, messages not regarding artifact evaluations.

15. The apparatus of claim 10, further comprising:
an evaluation providing module,
to receive from a client a find artifact request for a specified type of registry artifact, the request including an evaluation find qualifier;
to create a redacted find artifact request by extracting the evaluation find qualifier from the find artifact request;
to forward to the registry the redacted find artifact request;
to receive from the registry a response list of zero or more artifact identifying keys, responsive to the redacted find artifact request;
to retrieve evaluation values associated with any artifact identifying keys in the response list; and
to forward to the client, the response list of artifact identifying keys and the associated evaluation values.

16. A tangible machine-readable medium comprising instructions, which when executed by a machine, cause the machine to perform a method comprising:
receiving from a client a request to add an evaluation of an artifact in the registry;
receiving from the client a key identifying the artifact and an evaluation value associated with the artifact identifying key;
receiving with the evaluation addition request a key identifying an evaluation system model;
determining the evaluation addition request is valid if the registry has an artifact matching the artifact identifying key and if the requested evaluation value matches a value in a list of valid evaluation values associated with an evaluation system model matching the evaluation system model identifying key; and
storing an evaluation, including storing the artifact identifying key and the associated evaluation value, if the evaluation addition request is authorized and valid.

17. The tangible machine-readable medium of claim 16, wherein the method further comprises:
   receiving from the client a request for authorization, a key identifying a user of the client and a credential associated with the user;
   forwarding to the registry the authorization request, the user identifying key and the user credential;
   receiving from the registry a first authorization token;
   associating the first authorization token with the user identifying key;
   storing the first authorization token and associated user identifying key; and
   forwarding to the client the first authorization token.

18. The tangible machine-readable medium of claim 17, wherein the method further comprises:
   receiving with the evaluation addition request a second authorization token; and
   determining the evaluation addition request is authorized if the second authorization token matches the first authorization token, else determining the evaluation addition request is not authorized.

19. The tangible machine-readable medium of claim 16, wherein the method further comprises:
   forwarding to the registry the artifact identifying key;
   receiving, if the registry has the artifact matching the artifact identifying key, details of the matching registry artifact;
   forwarding to the registry the evaluation system model key; and
   receiving from the registry the list of valid values associated with the evaluation system model.

20. A method for an extension to a platform independent registry to maintain evaluations of artifacts in the registry, the method comprising:
   receiving from a client a request to add an evaluation of an artifact in the registry;
   receiving from the client a key identifying the artifact and an evaluation value associated with the artifact identifying key;
   authorizing the client to make the evaluation addition request, the authorizing comprising
      receiving from the client a request for authorization, a key identifying a user of the client, and a credential associated with the user;
      forwarding to the registry the authorization request, the user identifying key, and the user credential;
      receiving from the registry an authorization token;
      associating the authorization token with the user identifying key;
      storing a copy of the authorization token and associated user identifying key;
      forwarding to the client the authorization token; and
   storing an evaluation, including storing the artifact identifying key and the associated evaluation value, if the evaluation addition request is authorized and valid.

21. The method of claim 20, further comprising:
   receiving with the evaluation addition request an authorization token; and
   determining the evaluation addition request is authorized if the authorization token received with the addition request matches the stored authorization token copy, else determining the evaluation addition request is not authorized.

22. A method for an extension to a platform independent registry to maintain evaluations of artifacts in the registry, the method comprising:
   receiving from a client a request to add an evaluation of an artifact in the registry;
   receiving from the client a key identifying the artifact and an evaluation value associated with the artifact identifying key;
   storing an evaluation, including storing the artifact identifying key and the associated evaluation value, if the evaluation addition request is authorized and valid;
   receiving from the client messages regarding artifact evaluations and messages not regarding such evaluations; and
   forwarding to the registry without processing by the extension, messages not regarding artifact evaluations.

23. A method for an extension to a platform independent registry to maintain evaluations of artifacts in the registry, the method comprising:
   receiving from a client a request to add an evaluation of an artifact in the registry;
   receiving from the client a key identifying the artifact and an evaluation value associated with the artifact identifying key;
   storing an evaluation, including storing the artifact identifying key and the associated evaluation value, if the evaluation addition request is authorized and valid
   receiving from a client a find artifact request for a specified type of registry artifact, the request including an evaluation find qualifier;
   creating a redacted find artifact request by extracting the evaluation find qualifier from the find artifact request;
   forwarding to the registry the redacted find artifact request;
   receiving from the registry a response list of zero or more artifact identifying keys, responsive to the redacted find artifact request;
   retrieving evaluation values associated with any artifact identifying keys in the response list; and
   forwarding to the client, the response list of artifact identifying keys and the associated evaluation values.

24. An apparatus to maintain evaluations of artifacts in a platform independent registry, the apparatus comprising:
   an evaluation addition module to receive from a client, using one or more processors, a request to add an evaluation of an artifact in the registry, a key identifying the artifact, and an evaluation value associated with the artifact identifying key;
   an evaluation authorization issue module,
      to receive from the client a request for authorization, a key identifying a user of the client and a credential associated with the user,
      to forward to the registry the authorization request, the user identifying key and the user credential,
      to receive from the registry an authorization token;
      to associate the authorization token with the user identifying key;
      to store a copy of the authorization token and associated user identifying key, and
      to forward to the client the authorization token; and
   an evaluation storage module to save the artifact identifying key and the associated evaluation value, if the evaluation addition request is authorized and valid.

25. The apparatus of claim 24, further comprising:
   an evaluation authorization check module
      to receive with the evaluation addition request an authorization token, and
      to determine the evaluation addition request is authorized if the authorization token received with the addition request matches the stored authorization token copy, else to determine the evaluation addition request is not authorized.

26. An apparatus to maintain evaluations of artifacts in a platform independent registry, the apparatus comprising:
- an evaluation addition module to receive from a client, using one or more processors, a request to add an evaluation of an artifact in the registry, a key identifying the artifact, and an evaluation value associated with the artifact identifying key;
- an evaluation storage module to save the artifact identifying key and the associated evaluation value, if the evaluation addition request is authorized and valid;
- a message receiving module,
  - to receive from the client messages regarding artifact evaluations and messages not regarding such evaluations; and
  - forwarding to the registry without processing by the apparatus, messages not regarding artifact evaluations.

27. An apparatus to maintain evaluations of artifacts in a platform independent registry, the apparatus comprising:
- an evaluation addition module to receive from a client, using one or more processors, a request to add an evaluation of an artifact in the registry, a key identifying the artifact, and an evaluation value associated with the artifact identifying key;
- an evaluation storage module to save the artifact identifying key and the associated evaluation value, if the evaluation addition request is authorized and valid;
- an evaluation providing module,
  - to receive from a client a find artifact request for a specified type of registry artifact, the request including an evaluation find qualifier;
  - to create a redacted find artifact request by extracting the evaluation find qualifier from the find artifact request;
  - to forward to the registry the redacted find artifact request;
  - to receive from the registry a response list of zero or more artifact identifying keys, responsive to the redacted find artifact request;
  - to retrieve evaluation values associated with any artifact identifying keys in the response list; and
  - to forward to the client, the response list of artifact identifying keys and the associated evaluation values.

28. A tangible machine-readable medium comprising instructions, which when executed by a machine, cause the machine to perform a method comprising:
- receiving from a client a request to add an evaluation of an artifact in the registry;
- receiving from the client a key identifying the artifact and an evaluation value associated with the artifact identifying key;
- receiving from the client a request for authorization, a key identifying a user of the client and a credential associated with the user;
- forwarding to the registry the authorization request, the user identifying key and the user credential;
- receiving from the registry a first authorization token;
- associating the first authorization token with the user identifying key;
- storing the first authorization token and associated user identifying key; and
- forwarding to the client the first authorization token; and
- storing an evaluation, including storing the artifact identifying key and the associated evaluation value, if the evaluation addition request is authorized and valid.

29. The tangible machine-readable medium of claim 28, further comprising additional instructions, which when executed by a machine, cause the machine to perform the method stages of:
- receiving with the evaluation addition request a second authorization token; and
- determining the evaluation addition request is authorized if the second authorization token matches the first authorization token, else determining the evaluation addition request is not authorized.

30. A tangible machine-readable medium comprising instructions, which when executed by a machine, cause the machine to perform a method comprising:
- receiving from a client a request to add an evaluation of an artifact in the registry;
- receiving from the client a key identifying the artifact and an evaluation value associated with the artifact identifying key;
- storing an evaluation, including storing the artifact identifying key and the associated evaluation value, if the evaluation addition request is authorized and valid
- receiving from the client messages regarding artifact evaluations and messages not regarding such evaluations; and
- forwarding to the registry without processing by the extension, messages not regarding artifact evaluations.

31. A tangible machine-readable medium comprising instructions, which when executed by a machine, cause the machine to perform a method comprising:
- receiving from a client a request to add an evaluation of an artifact in the registry;
- receiving from the client a key identifying the artifact and an evaluation value associated with the artifact identifying key;
- storing an evaluation, including storing the artifact identifying key and the associated evaluation value, if the evaluation addition request is authorized and valid;
- receiving from a client a find artifact request for a specified type of registry artifact, the request including an evaluation find qualifier;
- creating a redacted find artifact request by extracting the evaluation find qualifier from the find artifact request;
- forwarding to the registry the redacted find artifact request;
- receiving from the registry a response list of zero or more artifact identifying keys, responsive to the redacted find artifact request;
- retrieving evaluation values associated with any artifact identifying keys in the response list; and
- forwarding to the client, the response list of artifact identifying keys and the associated evaluation values.

* * * * *